United States Patent
Barber et al.

(10) Patent No.: US 11,150,536 B2
(45) Date of Patent: Oct. 19, 2021

(54) TECHNIQUES FOR USING NONLINEAR ELECTROMAGNETIC MATERIALS TO PRODUCE ARBITRARY ELECTROMAGNETIC SIGNALS

(71) Applicants: S2 CORPORATION, Bozeman, MT (US); MONTANA STATE UNIVERSITY, Bozeman, MT (US)

(72) Inventors: Zeb William Barber, Bozeman, MT (US); Calvin Harrington, Bozeman, MT (US); Krishna Mohan Rupavatharam, Bozeman, MT (US); Peter B. Sellin, Bozeman, MT (US); Craig Benko, Bozeman, MT (US)

(73) Assignees: S2 CORPORATION, Bozeman, MT (US); MONTANA STATE UNIVERSITY, Bozeman, MT (US)

( * ) Notice: Subject to any disclaimer, the term of this patent is extended or adjusted under 35 U.S.C. 154(b) by 175 days.

(21) Appl. No.: 16/522,977

(22) Filed: Jul. 26, 2019

(65) Prior Publication Data
US 2020/0033696 A1 Jan. 30, 2020

Related U.S. Application Data

(60) Provisional application No. 62/703,778, filed on Jul. 26, 2018.

(51) Int. Cl.
G02F 1/35 (2006.01)
G02F 1/37 (2006.01)

(52) U.S. Cl.
CPC ............ G02F 1/353 (2013.01); *G02F 1/3534* (2013.01); *G02F 1/37* (2013.01)

(58) Field of Classification Search
CPC ........... G02F 1/353; G02F 1/3534; G02F 1/37
See application file for complete search history.

(56) References Cited

U.S. PATENT DOCUMENTS 5,963,352 A 10/1999 Atlas et al.
6,587,257 B1 7/2003 Davies
(Continued)

FOREIGN PATENT DOCUMENTS

| CN | 108254992 A | * | 7/2018 | ............... G02F 1/35 |
| EP | 2234454 A1 | | 9/2010 | |
| WO | 2008092193 A1 | | 8/2008 | |

OTHER PUBLICATIONS

Babbitt et al., From Spectral Holeburning Memory to Spatial-Spectral Microwave Signal Processing, Laser Physics 24, 2014, p. 094002, vol. 9.
(Continued)

*Primary Examiner* — Daniel Petkovsek
(74) *Attorney, Agent, or Firm* — Wolter VanDyke Davis, PLLC; Eugene J. Molinelli

(57) ABSTRACT

Techniques for generating an arbitrary target electromagnetic signal with a nonlinear material, include determining a time varying target amplitude and target phase and an order n of a nonlinear material. For each time, a first set of nth roots of the target amplitude and a second set of nth roots of the target phase are determined. An input amplitude based on one value from the first set and an input phase based on one value from the second set is determined at each time. A difference between temporally successive values of phase is minimized. An electromagnetic signal is modulated to impose the input amplitude and phase to produce a modulated electromagnetic input signal that is introduced into the nonlinear material to produce a target electromagnetic signal.

28 Claims, 16 Drawing Sheets

(56) References Cited

U.S. PATENT DOCUMENTS

| | | |
|---|---|---|
| 6,931,579 B2 * | 8/2005 | Roberts .............. G01R 31/3167 |
| | | 702/108 |
| 7,145,714 B2 | 12/2006 | Roberts et al. |
| 9,020,360 B2 | 4/2015 | Stiffler et al. |
| 9,829,910 B2 | 11/2017 | Roberts |
| 9,979,404 B1 * | 5/2018 | Drost .................... H03F 1/0294 |
| 2002/0181605 A1 | 12/2002 | Nation |
| 2003/0043933 A1 | 3/2003 | Kintis |
| 2007/0147848 A1 | 6/2007 | Vieira et al. |

OTHER PUBLICATIONS

Barber et al., Spatial-Spectral Holographic Real-Time Correlative Optical Processor with >100 GB/s Throughput, Applied Optics, 2017, pp. 5398-5406, vol. 56.

Barbour et al., High Power and High SFDR Frequency Conversion Using Sum Frequency Generation in KTP Waveguides, Optics Letters 41, 2016, p. 3639, vol. 15.

Carraz et al., Compact and Robust Laser System for Onboard Atom Interferometry, Applied Physics B, 2009, pp. 405-411, vol. 97.

Laurell et al., Sum-frequency Generation in Segmented KTP Waveguides, Applied Physics Letters, 1992, pp. 1064-1066, vol. 60.

Laurell, F., Periodically Poled Materials for Miniature Light Souices, Optical Materials, 1999, pp. 235-244, vol. 11.

Rusu et al., Efficient Generation of Green and UV Light in a Single PP-KTP Waveguide Pumped by a Compact All-Fiber System, Applied Physics Letters, 2006, p. 121105, vol. 88.

Zelm et al., Pure Harmonic Upconversion in Radio-on-Fiber Systems, Optical Transmission Systems and Equipment for Wdm Networking Ii 5247, 2003, pp. 382-392.

* cited by examiner

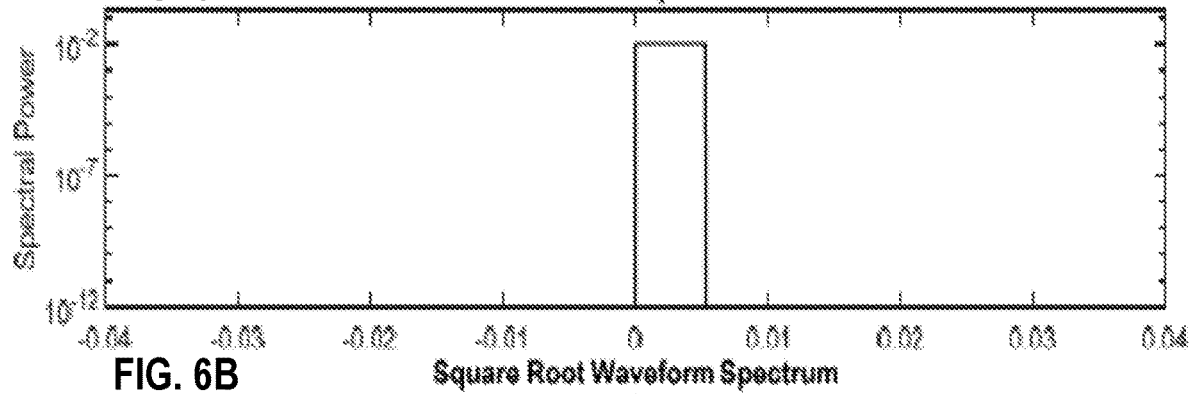
FIG. 6A Waveform Spectrum
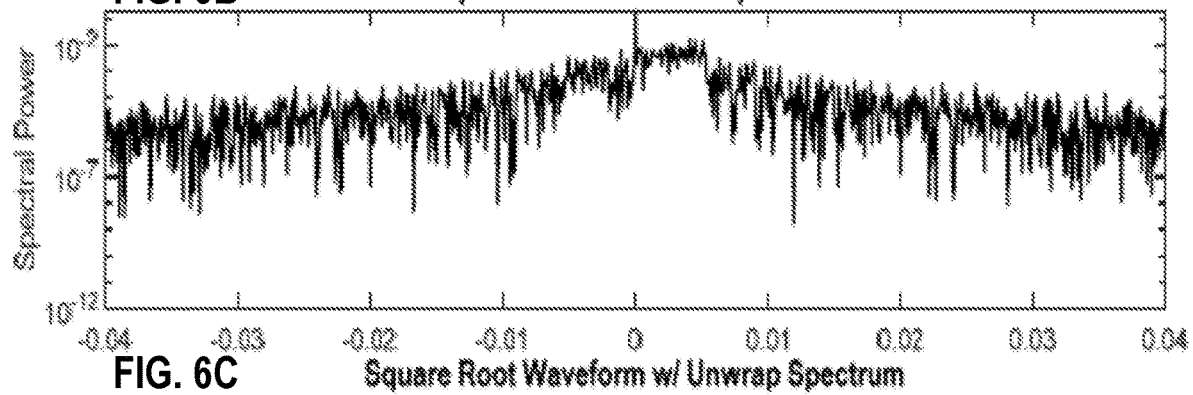
FIG. 6B Square Root Waveform Spectrum
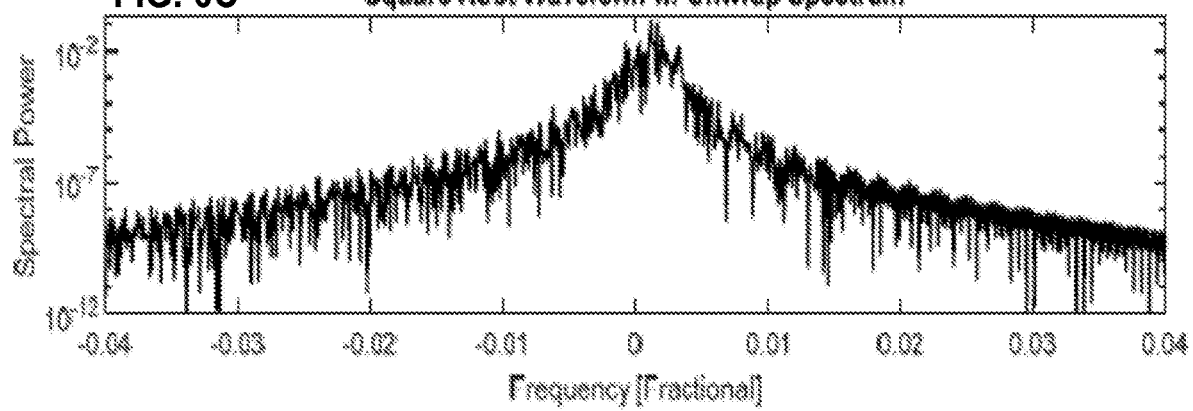
FIG. 6C Square Root Waveform w/ Unwrap Spectrum

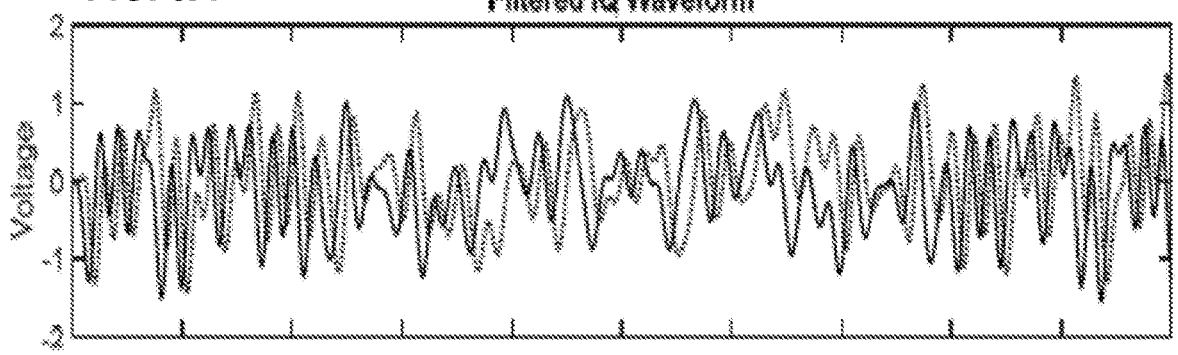
FIG. 8A Filtered IQ Waveform
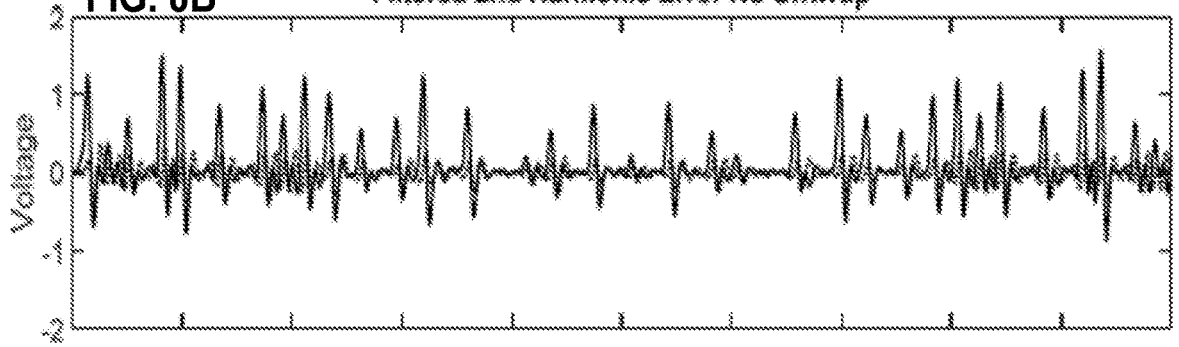
FIG. 8B Filtered 2nd Harmonic Error No Unwrap
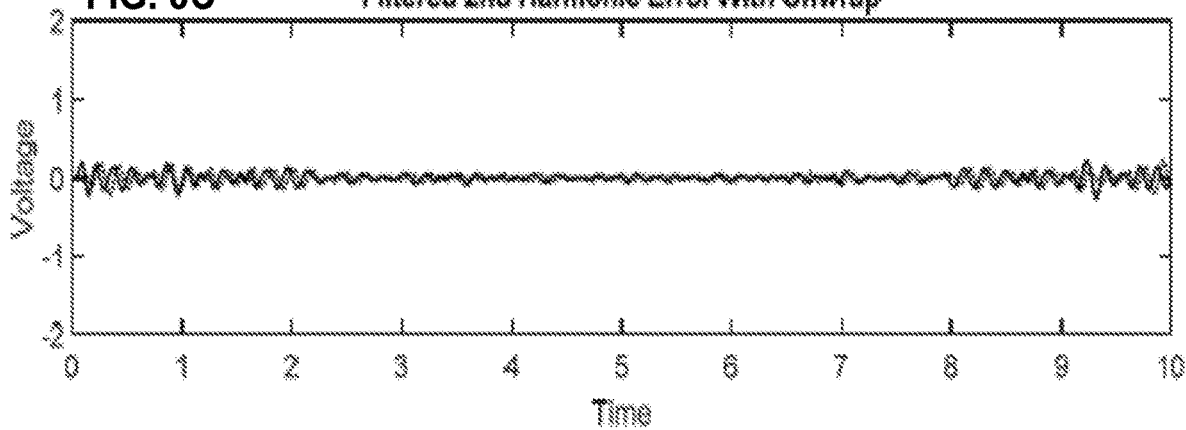
FIG. 8C Filtered 2nd Harmonic Error With Unwrap

TECHNIQUES FOR USING NONLINEAR ELECTROMAGNETIC MATERIALS TO PRODUCE ARBITRARY ELECTROMAGNETIC SIGNALS

CROSS-REFERENCE TO RELATED APPLICATIONS

This application claims benefit of Provisional Appln. 62/703,778, filed Jul. 26, 2018, the entire contents of which are hereby incorporated by reference as if fully set forth herein, under 35 U.S.C. § 119(e).

STATEMENT OF GOVERNMENTAL INTEREST

This invention was made with Government support under Contract No. 2017-17013000003 awarded by the Intelligence Advanced Research Projects Agency (IARPA). The Government has certain rights in the invention.

BACKGROUND

Nonlinear optics (NLO) is the branch of optics that describes the behavior of light in nonlinear media, that is, media in which the polarization density P responds non-linearly to the electric field E of the light. The non-linearity is typically observed only at very high light intensities (values of atomic electric fields, typically $10^8$ Volts/meter) such as those provided by lasers. In nonlinear optics, the superposition principle no longer holds. Nonlinear optical phenomena, in which the optical fields are not too large, can be described by a Taylor series expansion of the dielectric polarization density (electric dipole moment per unit volume) P(t) at time t in terms of the electric field E(t), as given by Equation 1a.

$$P(t) = \varepsilon_0 \{\chi^{(1)} E(t) + \chi^{(2)} E^2(t) + \chi^{(3)} E^3(t) + \ldots \} \quad (1a)$$

where the coefficients $\chi^{(i)}$ are the i-th order susceptibilities of the medium, and the importance of such a term is generally referred to as an i-th order nonlinearity. In general, $\chi^{(i)}$ is an (i+1) rank tensor representing both a polarization-dependent nature of the parametric interaction and the symmetries, if any, of the nonlinear material. A continuous electromagnetic wave of frequency $f_0$ can be represented by a time oscillating wave of the form given by Equation 1b.

$$E(t) = E_0 e^{i(2\pi f_0 t + \phi)} \quad (1b)$$

where $\phi$ indicates phase, i.e., a particular point within the oscillation cycle.

For coherent photonics systems, in which the phase $\phi$ matters, and applications that require operation at a specific optical frequency or wavelength band, it is sometimes advantageous or necessary to begin the system with a laser producing a laser beam at frequency, $f_0$, at a subharmonic of the target frequency, $f_{tar}$, given by Equation 1c.

$$f_0 = f_{tar}/n \quad (1c)$$

where n is an integer, and then utilize a material with $\chi^{(2)}$ or $\chi^{(3)}$ or higher order optical nonlinearities to harmonically generate coherent laser light at the desired optical frequency. Electromagnetic wave frequency f and wavelength $\lambda$ are related by the speed of light c in a medium, given by Equation 1d.

$$f = c/\lambda \quad (1d)$$

So wavelength decreases as frequency increases during nonlinear frequency generation.

Advances in nonlinear optics and solid-state laser systems (including periodically poled nonlinear waveguides [1-5], fiber optic lasers, and laser systems, among others) have made this two-step approach often more practical than directly generating laser light at the target frequency in terms of final performance such as optical power generated, achievable pulse-width and peak powers, laser linewidth, among others. Other factors that may improve using the two step approach include system size, weight, power efficiency, and cost. An example of this is the use of narrow linewidth and frequency-stable laser sources and optical subsystems such as amplifiers, modulators, and filters developed for fiber sensing applications in the 1530 nanometer (nm, 1 nm=$10^{-9}$ meters) to 1570 nm C-band and 1570 nm to 1620 nm L-band, followed by NLO second harmonic generation (SHG) to reach wavelengths in the Near Infrared (NIR) (760 nm to 810 nm) for applications such as accessing the D1 and D2 transitions in Rb for atomic interferometry [6], or the 3H6-3H4 transition in solid-state Tm materials [7, 8]. Additional example applications that can require specific wavelengths of operation include interaction with solid state material systems, spectroscopy, control of molecular or atomic resonances, access to propagation transmission windows for the atmosphere or for materials such as water, or access to UV wavelengths.

SUMMARY

In was recognized here that, while a nonlinear optical harmonic generation approach is well-established when only a continuous single frequency or pulsed laser is required, for applications where the light at the target wavelength is needed to be temporally or frequency modulated before interaction with the rest of the system, improvements can be achieved. Similar approaches can be used for non-linear radio frequency (RF) systems. Thus, techniques are provided for using nonlinear electromagnetic materials to produce arbitrary electromagnetic signals. In the approaches utilized herein, it is noted that one harmonic (n, typically n=2 or n=3) is dominant in power for a particular NLO medium, and the techniques presented here are directed to the best use of a NLO medium based on the dominant harmonic.

In a first set of embodiments, a method for generating an arbitrary target electromagnetic signal with a nonlinear material includes determining a target electromagnetic waveform having a time varying target amplitude and a time varying target phase. The method also includes determining an integer order n of a nonlinear material to use in generation of the target electromagnetic waveform. The method further includes determining, for each time, a first set of nth roots of the target amplitude and a second set of nth roots of the target phase. Still further, the method includes determining a time varying input amplitude based on one selected amplitude root value from the first set at each time and a time varying input phase based on one selected phase root value from the second set at each time. A difference between temporally successive values of the selected phase roots is minimized by phase unwrapping. Even further still, the method includes modulating an electromagnetic signal from a source to impose the time varying input amplitude and the time varying input phase to produce a modulated electromagnetic input signal. Yet further still, the method includes introducing the modulated electromagnetic input signal into the nonlinear material to produce a target electromagnetic signal.

In some embodiments of the first set, the target electromagnetic waveform, or the modulated electromagnetic input signal, or both, are complex. In some embodiments of the first set, modulating the electromagnetic signal from the source is performed with a computer-controlled radio frequency modulator. In some embodiments of the first set, the one selected amplitude root value from the first set at each time is a positive definite value. In some embodiments of the first set, the nonlinear material provides harmonic waveform generation.

In some embodiments of the first set, the source is a laser, the electromagnetic signal is an optical signal, the modulated electromagnetic input signal is a modulated optical signal, the nonlinear material is a non-linear optical material, and the target electromagnetic signal is a target optical signal.

In other sets of embodiments, a computer-readable medium, apparatus or electromagnetic system is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 6A through FIG. 6C are spectral plots of the example time series depicted in FIG. 5B through FIG. 5D, respectively, according to various embodiments;

FIG. 8A is a time series that illustrates an example target waveform, according to another embodiment;

FIG. 8B through FIG. 8C are time series that illustrate example errors in the time series produced by various forms of predistortion compared to the target optical waveform of FIG. 8A, according to various embodiments;

DETAILED DESCRIPTION

Figure 1A:
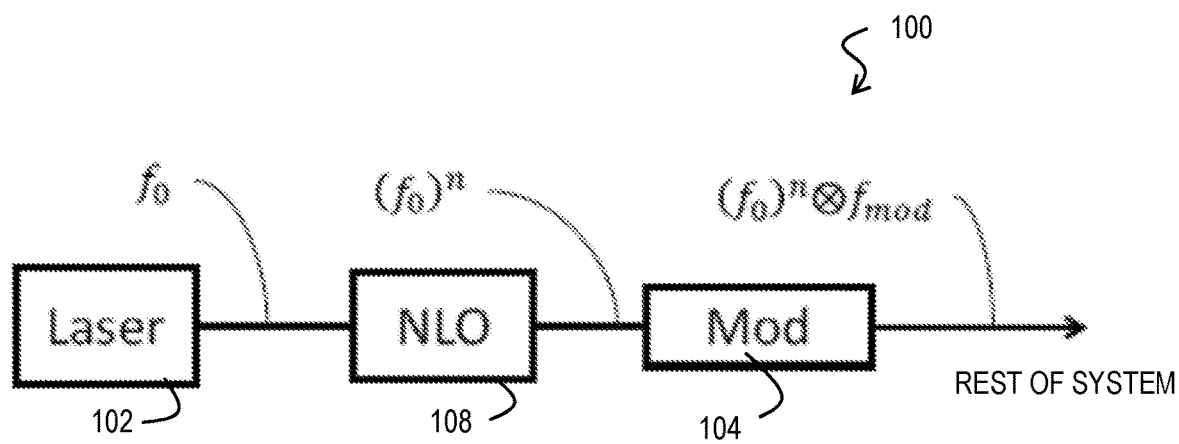
FIG. 1A is a block diagram that illustrates one subsystem that uses a nonlinear optical (NLO) material to produce an optical waveform.

A method and apparatus are described for pre-distorting an electromagnetic signal before a nonlinear electromagnetic interaction to achieve an arbitrary optical signal. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of using a $2^{nd}$ order nonlinear optical harmonic material to generate an arbitrary time-dependent waveform with amplitude $a(t)$ and phase $\phi(t)$, such as for programming a spatial spectral holographic (SSH) material. However, the invention is not limited to this context. In other embodiments the same or higher order nonlinear optical or radio frequency (RF), harmonic or non-harmonic (e.g., frequency mixing) materials are used to generate an arbitrary electromagnetic waveform for the same or other uses.

For example, in various embodiments the arbitrary wave form is used for: extreme bandwidth spectrum generation; extreme bandwidth spectrum analyzers; extreme bandwidth signal correlators; extreme bandwidth signal scramblers; extreme bandwidth signal descramblers; software defined radio up-conversion; or, wideband direction finding with Time Delay of Arrival (TDOA) determination techniques; perturbative nonlinear optics; or other nonlinear process that obeys a power law of type given by Equation 1a; or some combination.

Example nonlinear optical materials include Non-linear frequency mixing or harmonic generation in optical crystals, liquids, or gases, Optically-resonant cavity-enhanced harmonic generation from an enclosed non-linear material, Non-linear frequency mixing or harmonic generation in periodically-poled crystals or waveguides, Non-linear optical fibers producing intensity-dependent harmonics of the input light frequencies (e.g. so-called "Holey Fibers," also known as photonic crystal fibers) in optical frequency combs, Non-linear phase modulation to higher order sidebands in optical modulators, Four-wave mixing in spectrally inhomogeneous media, with multiple spectral components, N-wave mixing in spectrally inhomogeneous media, with multiple spectral components, Raman shifting between optical-electronic states, with or without resonant cavity enhancement, Stokes shifting between optical-electronic states, with or without resonant cavity enhancement, or some combination.

Example RF nonlinear materials include: fast Schottky diodes, harmonic generation using non-linear RF diodes; frequency mixing using non-linear RF diodes; non-linear conversion using non-linear transmission line (NLTL) frequency comb generators, generation of wideband 5G RF waveforms from harmonic generation instead of up-conversion.

1. Overview

There are two general approaches in the overall system design. The first approach is depicted in FIG. 1A. FIG. 1A is a block diagram that illustrates one subsystem 100 that uses a nonlinear optical (NLO) material 108 to produce an optical waveform. FIG. 1 begins with a single frequency laser 102 at $f_0$, a nth order sub-harmonic of the target frequency $f_{tar}$ as given by Equation 1c, followed by optical harmonic generation in a nonlinear medium (NLO) 108 to the target optical frequency ($f_{tar}=n\ f_0$) designated $(f_0)^n$ followed by optical modulation in modulator 104 (e.g., an electro-optic modulator, EOM, or acousto-optic modulator, AOM, as well as other types of modulators that alter frequency, amplitude, phase, polarization or some combination) at the target frequency designated $(f_0)^n \otimes f_{mod}$ before interaction with the rest of the optical system. Note that the designation $(f_0)^n$ does not indicate the frequency raised to the nth power, but the complete electromagnetic signal (RF or optical) of Equation 1b raised to the nth power, which has the effect of raising the amplitude to the nth power and multiplying the frequency by n. The symbol $\otimes$ denotes an integral frequency convolution of the earlier spectrum of source laser harmonic $(f_0)^n$ with a later modulation spectrum $f_{mod}$. For a single frequency laser, nonlinear crystal based optical harmonic generation produces a pure single frequency laser at the harmonic frequency. In practice, $(f_0)^n$ is largely single-frequency but may also have additional smaller frequency components arising from the input EM frequency source (e.g., a laser or RF oscillator) or the frequency harmonic generation (or non-linear mixing) process.

Figure 1B:
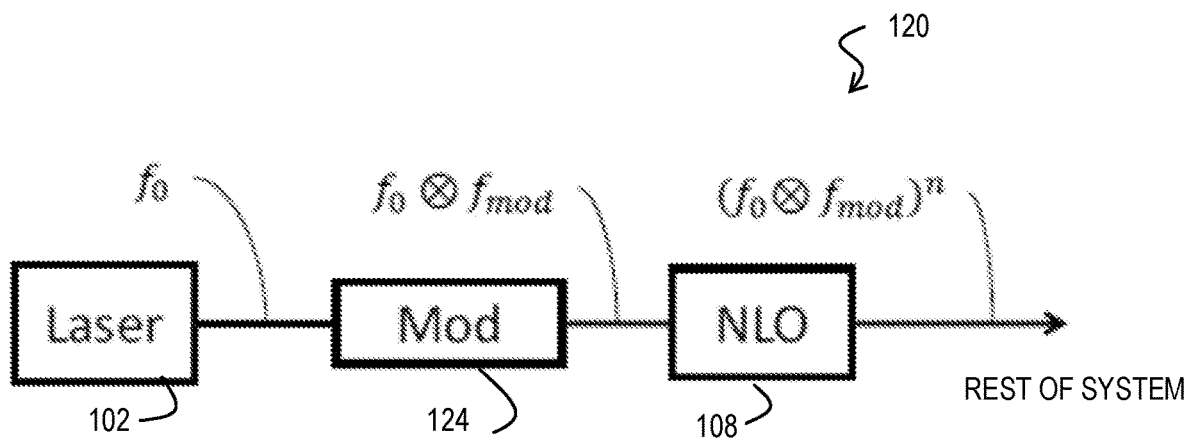
FIG. 1B is a block diagram that illustrates a different subsystem that uses a nonlinear optical (NLO) material to produce an optical waveform.

The second approach is depicted in FIG. 1B. FIG. 1B is a block diagram that illustrates a different subsystem 120 that uses a nonlinear optical (NLO) material to produce an optical waveform. In FIG. 1B, the approach begins with a single frequency laser 102 at $f_0$, a nth order sub-harmonic of the target frequency $f_{tar}$ as given by Equation 1c, followed by optical modulation in a narrower-bandwidth modulator 124 (e.g., in an EOM or AOM or other types of modulators that alter frequency, amplitude, phase, or polarization, or some combination) at the sub-harmonic frequency at or near $f_0$ designated $f_0 \otimes f_{mod}$, then followed by optical harmonic generation in a nonlinear medium (NLO) 108 to the target optical frequency (at or near $f_{tar}=n\ f_0$) designated $(f_0 \otimes f_{mod})^n$ before interaction with the rest of the optical system. The NLO step after the modulation produces distortions, such as in the frequency content indicated by the spectrum, that may be unsuitable for the application. Distortions can arise from frequency-mixing products in the spectrum due to additional mathematical terms that appear after algebraically raising the fully summed spectrum to the power n.

Figure 2:
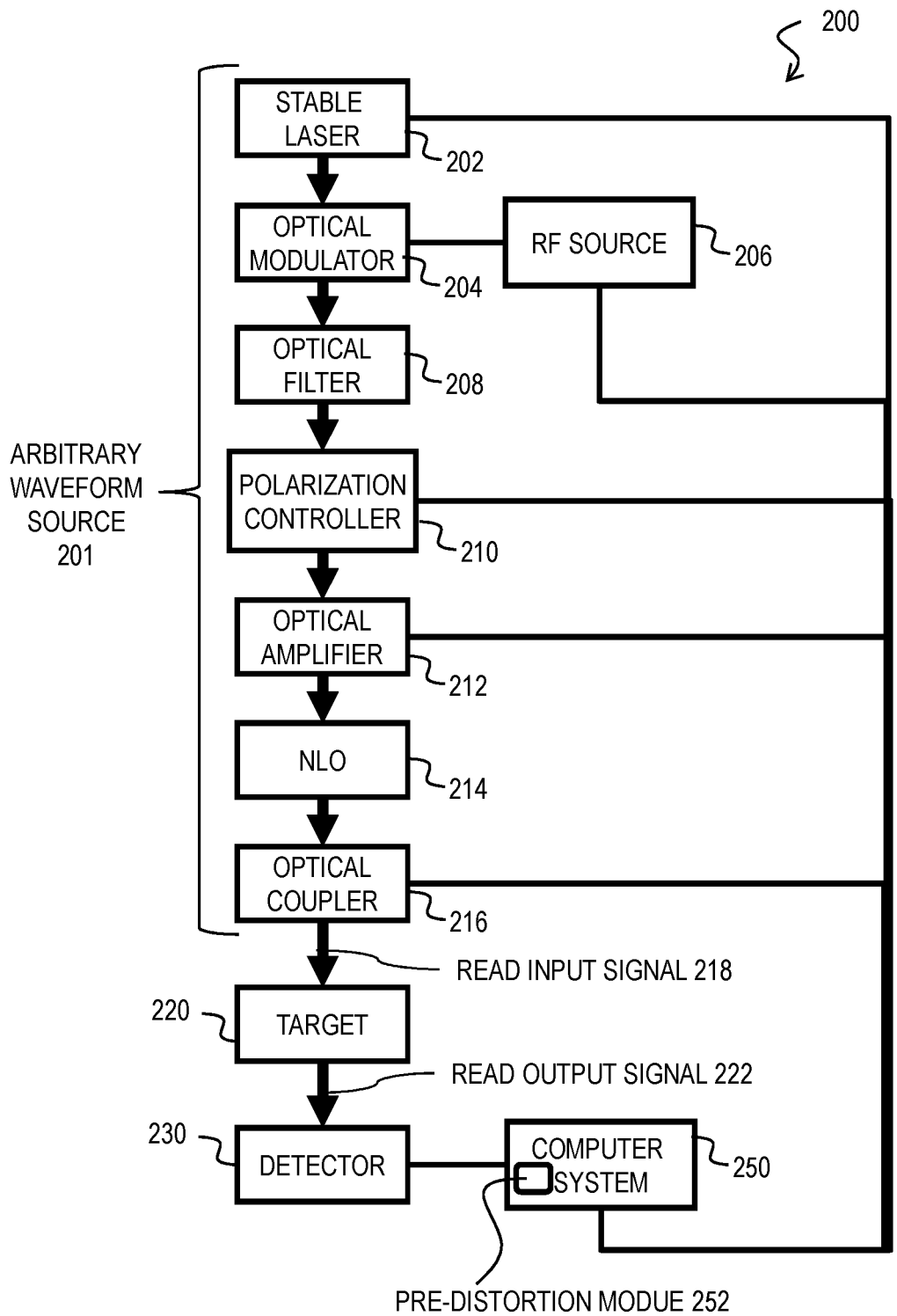
FIG. 2 is a block diagram that illustrates example components of optical system that uses an arbitrary waveform to probe a target, according to an embodiment.

FIG. 2 is a block diagram that illustrates example components of optical system 200 that uses an arbitrary waveform to probe a target 220, according to an embodiment. Optical signals are indicated by thick arrows. In the illustrated embodiment, the arbitrary waveform optical source 201 includes a stable laser 202, an optical modulator 204, a radio frequency (RF) source 206, an optical filter 208, a polarization controller 210, an optical amplifier 212, a nonlinear optical medium 214 and an optical coupler 216. As used herein, the term optical coupler indicates any means for directing an optical beam and includes fiber-optical circulators, fiber couplers, and free-space optical components (e.g., mirrors, lenses, polarizers, open space, vacuum space, etc.). Although components are shown as integral blocks in a particular order for purposes of illustration, in other embodiments one or more components are arranged in a different order or are omitted or the functions of one or more components are split among a plurality of different components that serve the same functions, or the functions of two or more components are combined, or the source 200 is changed in some combination of ways. For example, in some embodiments the polarization controller 210 or optical amplifier 212 is moved after the NLO 214, or multiple optical amplifiers or polarization controllers are included.

In the illustrated embodiment, the output of the source 201 is used as a read input signal 218 to probe the spectral content of a target 220. The probing operation involves a target 220, detector 230 and digital signal processor such as computer system 250. As a result of the interaction of the read input signal 218 with the target, a read output signal 222 is produced that is measured at optical detector 230. An electronic signal output by the detector 230 is input to the computer system 250, such as a computer described below with reference to FIG. 13 or a chip set described below with reference to FIG. 14, to determine the spectral content of the target 220. The computer system 250 also controls any electronically controlled device, such as laser 202, RF source 206 or modulator 204 or polarization controller 210 or optical amplifier 212 or optical couplers 216, or some combination. The computer system 250 also includes a pre-distortion module 252, described in more detail below, that causes the output from the NLO 214 to conform to some arbitrary, known waveform.

A disadvantage for the first approach (FIG. 1A modulation after NLO) is often the lower performance of the electronic-to-optical modulation components at the target optical frequency relative to similar components at the lower optical frequency. For example, electro-optic modulators developed for the fiber telecommunications industry (C or L bands) are generally more compact, have higher bandwidth, offer much higher power handling capability, and cost less than comparable modulators in the NIR or visible. Additional advantages may not come from the modulator itself, but in other components at the two bands like optical amplifiers, optical filters, and optical fibers for signal transport.

The second approach (FIG. 1B modulation before NLO) can often then be significantly advantageous for the overall system, e.g., system 200. However, an issue arises in the nonlinear optical process when the modulation signal is inherently multi-frequency. In this case, in addition to the harmonics of the carrier tones, spectral components at the sum frequency of every pair of optical tones in the signal are also generated. This leads to additional unwanted signals in the frequency domain. In the time domain this corresponds to amplitude and phase distortion of the modulation.

Figure 3A:
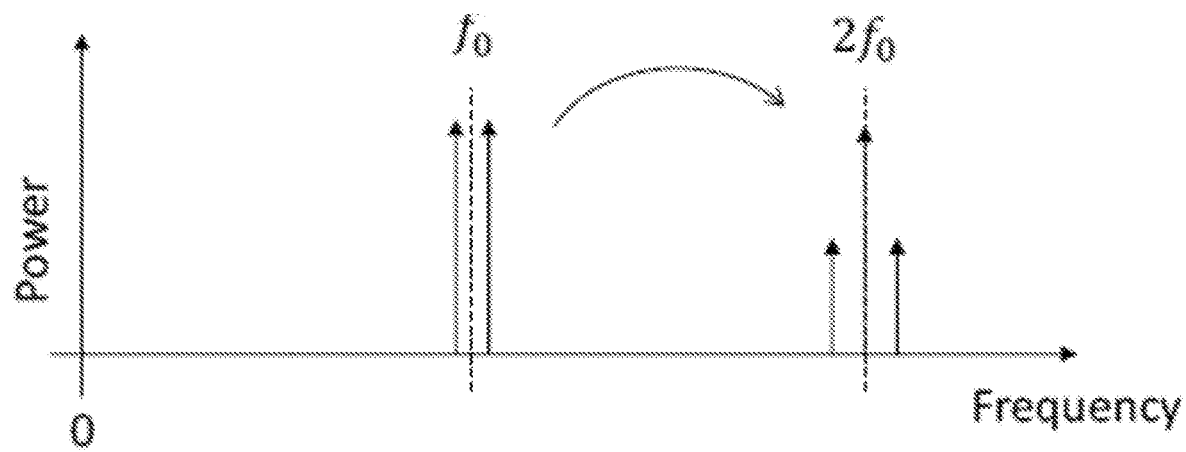
FIG. 3A is a spectral diagram that illustrates an example of how a modulated optical signal is distorted by nonlinear optical harmonic generation.

FIG. 3A is a spectral diagram that illustrates an example of how a modulated optical signal is distorted by nonlinear optical harmonic generation. The modulated optical frequency has two discrete frequencies (tones) at $f_0 - \Delta f$ and $f_0 + \Delta f$. After interactions with a $\chi^{(2)}$ NLO medium, each tone is proportionally doubled in frequency at $2(f_0 - \Delta f)$ and $2(f_0 + \Delta f)$, but there is an additional tone of higher power at the sum of the two tones ($2f_0$). This output signal may be inappropriate for an intended use.

Figure 3B:
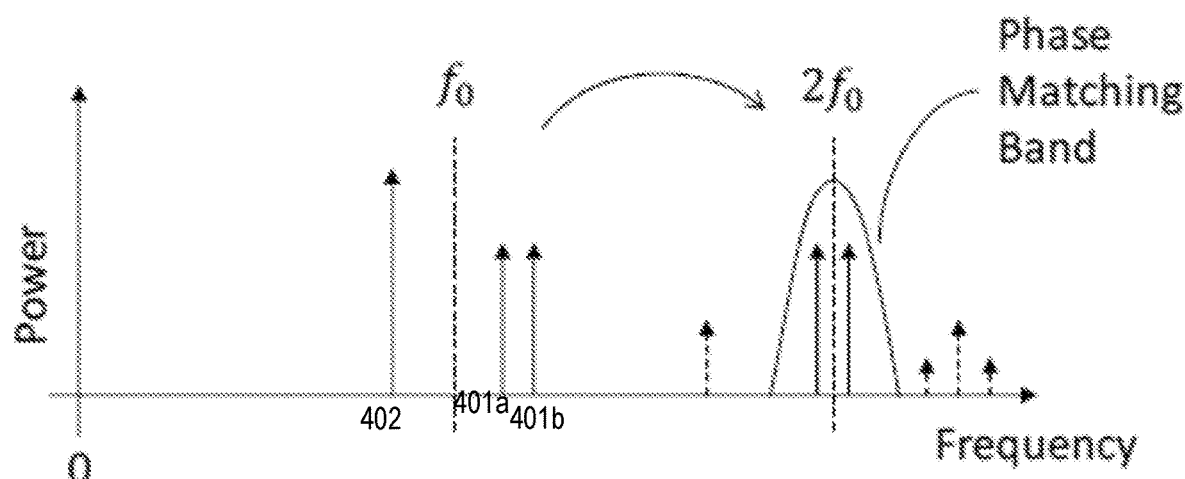
FIG. 3B is a spectral diagram that illustrates an example of how a modulated optical signal can be further modulated before nonlinear optical harmonic generation (called predistortion herein) to reduce the distortion, according to an embodiment.

One alternative method to use NLO to transfer a modulated signal with little distortion is to use sum frequency generation (SFG) of the modulated signal (e.g., two tones) with a second single frequency laser. FIG. 3B is a spectral diagram that illustrates an example of how a modulated optical signal can be further modulated before nonlinear optical harmonic generation (called pre-distortion herein) to reduce the distortion, according to an embodiment. To target a particular second harmonic frequency, $2f_0$, two lasers are used with frequencies spaced equidistant about $f_0$. One of the lasers is used to generate two tones 401a and 401b and the other laser produces a tone 402 that is opposite to the average of the two tones. If the spacing is large enough, then the second harmonic generation (SHG) terms from each laser will fall outside the phase matching bandwidth, indicated by the dashed envelope around $2f_0$, of the nonlinear process and not be converted. This SFG method requires the use of significant fiber optic, RF, and photonic components to implement due to the need to create two coherent lasers widely separated in frequency from $f_0$.

In an example embodiment, a method is demonstrated for generating arbitrary modulations at a harmonic of a laser frequency using modulation at the original laser frequency before the NLO medium, as depicted in FIG. 1B. In this example, high-speed arbitrary coherent optical modulation is implemented by complex modulation consisting of a nested Mach-Zehnder modulator driven by a complex waveform expressed by a real part called in-phase, I, and a complex part called in-quadrature, Q. This modulation is given by Equation 2a.

$$E_{mod}(t) = \Re \{[I(t) + iQ(t)]E_0 \exp(i[2\pi f_0 t])\} \quad (2a)$$

where $\Re$ represents taking the real part that corresponds to a real oscillatory field. An equivalent representation of an arbitrary modulated optical field is given by Equation 2b.

$$E_{mod}(t) = \Re \{E_0 a(t) \exp(i[2\pi f_0 t + \phi(t)])\} \quad (2b)$$

where $E_0$ and $f_0$ are the carrier amplitude and frequency before modulation and $a(t)$ and $\phi(t)$ are the amplitude and phase modulation waveforms. For In-Phase, Quadrature (IQ) modulation, Equations 2c and 2d apply.

$$a(t) = \sqrt{I(t)^2 + Q(t)^2} \quad (2c)$$

and $$\phi(t) = \angle[I(t) + iQ(t)] \quad (2d)$$

where $\phi(t) \in (-\pi, \pi]$, and $\angle$ denotes the phase angle. Note that a complex phasor description is used to describe each time-dependent coherent frequency component (I and Q) as a time-dependent but positive definite amplitude and a corresponding time-dependent phase angle.

For an NLO process where the power expansion of the nonlinearity given in Equation 1a is valid, and dominated by the nth order non-linearity (due to nature or filtering or other pre-conditioning), the resulting optical field is approximately proportional to the nth harmonic products given by Equation 3a.

$$E_{mod}(t)^n \propto \Re \{a(t)^n \exp(i[2\pi n f_0 t + n\phi(t)])\} \quad (3a)$$

If one desires to have the final modulation functions after the nonlinear process to be close to the relationships given in Equation 3b and 3c.

$$a'(t) = a(t)^n \quad (3b)$$

$$\phi'(t) = n\phi(t) \quad (3c)$$

Then the solutions are given in Equations 3d and 3e.

$$a(t) = \sqrt[n]{a'(t)} \quad (3d)$$

$$\phi(t) = \phi'(t)/n \quad (3e)$$

Translating these substitutions back into the IQ modulation waveforms used to drive an IQ modulator, one gets the predistortion modulation waveform of Equation 4.

$$I(t) \propto \Re \left\{ \sqrt[n]{a'(t)} \exp\left(i\left[\frac{\phi'(t)}{n}\right]\right) \right\}, Q(t) \propto \Im \left\{ \sqrt[n]{a'(t)} \exp\left(i\left[\frac{\phi'(t)}{n}\right]\right) \right\} \quad (4)$$

Of course, equations 2a through 4 hold for any electromagnetic wave, whether the frequency $f_0$ is in an optical band or RF band.

The compressed amplitude and phase solution of Equations 3d and 3e has been used for calculated predistortion compensation for electrically generated harmonic signals using fast Schottky diodes or mixers and for opto-electronically generated harmonics of RF and microwave signals by using nonlinear distortion of overdriven electro-optic modulators. The solution of Equation 4 has not been used previously on IQ modulated optical signals, the harmonics of which are generated by $\chi^{(2)}$ or $\chi^{(3)}$ or higher order nonlinear optical processes.

Figure 4:
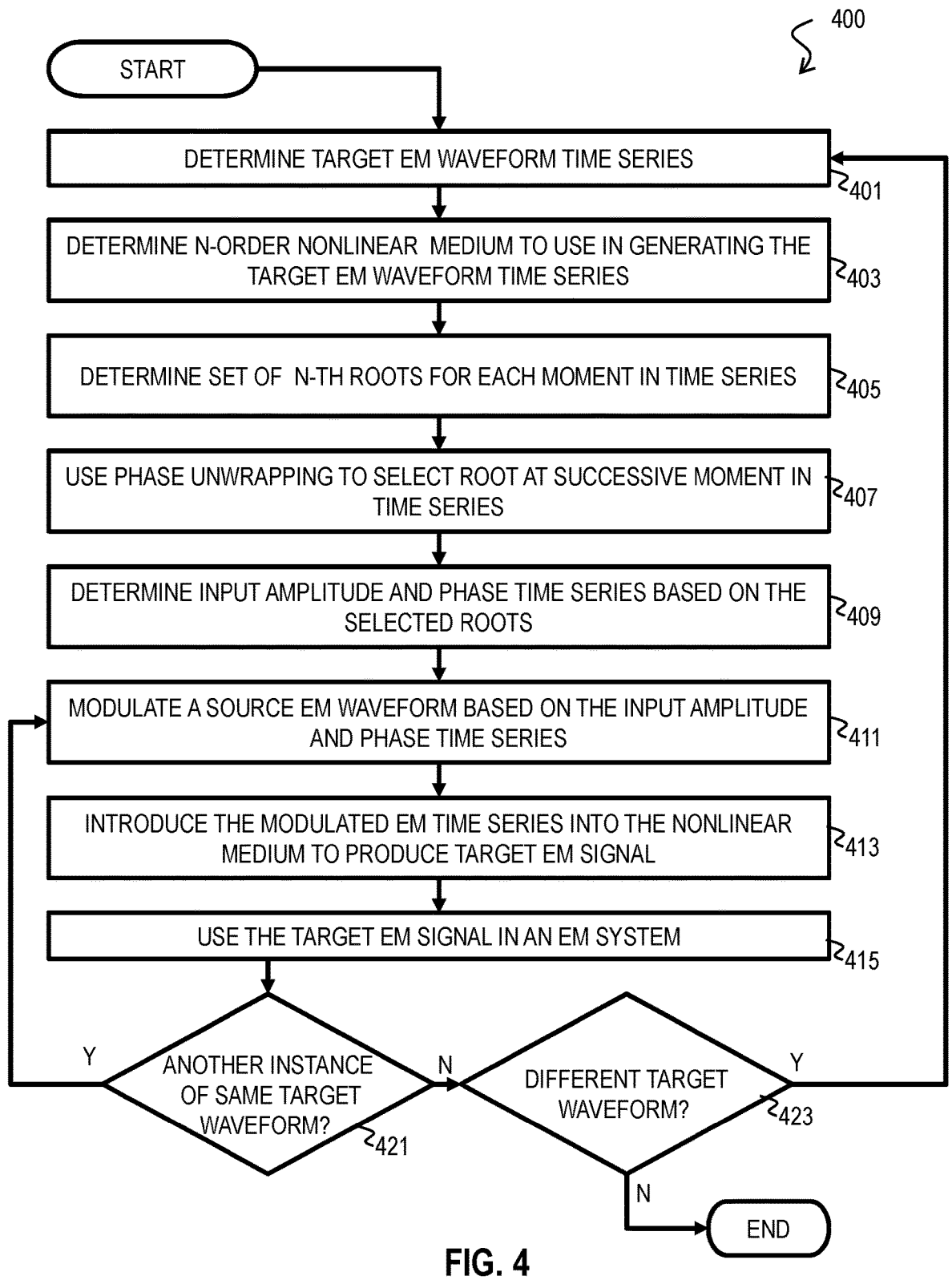
FIG. 4 is a flow diagram that illustrates an example method for generating an arbitrary target electromagnetic signal with a nonlinear material, according to an embodiment.

FIG. 4 is a flow diagram that illustrates an example method 400 for generating an arbitrary target electromagnetic signal with a nonlinear material, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401, a target electromagnetic waveform having a time varying target amplitude a(t) and a time varying target phase (t) is determined. This is equivalent to determining time varying in phase I(t) and quadrature Q(t) time series, which are the real and imaginary parts of the complex waveform. In some embodiments, the target waveform is a RF waveform; and, in some embodiments, it is an optical waveform. The information is determined in any manner known, such as receiving user input, or retrieving data from local or remote storage, either unsolicited or in response to a query or user prompt.

In step 403, an integer order n of a nonlinear material to use in generation of the target electromagnetic waveform is determined. This decision is based on the availability of laser, modulators and nonlinear media suitable for producing the target waveform. The value is determined in any manner known, such as receiving user input, or retrieving data from local or remote storage, either unsolicited or in response to a query or user prompt.

In step 405, for each time in the time series, a first set of, up to n, nth roots of the target amplitude are determined. In addition, in at least some embodiments, for each time in the time series, a second set of, up to n, nth roots of the target phase are determined.

While the solution in Equation 4 is correct, there are in fact a large number of solutions as there are up to n solutions to the nth root of a complex number. Furthermore, for a discrete time set of I(mΔt) and Q(mΔt) waveforms, the choice of each of the m points can be independent, which means for a waveform M points long there are $n^M$ possible solutions. Choosing which root(s) to include for each point of the solution can change the properties of the I(mΔt) and Q(mΔt) waveforms, including local continuity, differentiability, smoothness, dynamic range, and bandwidth.

Figure 5A:
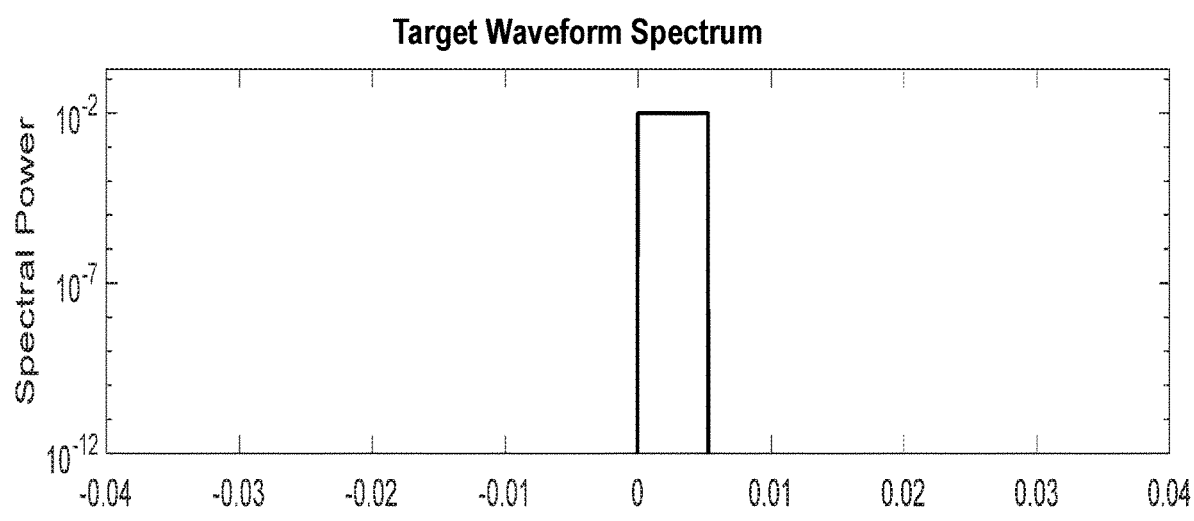
FIG. 5A is a spectral diagram that illustrates an example target waveform, according to an embodiment.

An example of this for n=2 is shown here. FIG. 5A is a spectral diagram that illustrates an example target waveform, according to an embodiment. The horizontal axis indicates frequency as a fractional change from a target frequency $f_{tar}$; and, the vertical axis indicates spectral power in arbitrary units on a logarithmic scale. It is a flat-topped spectrum of bandwidth about $0.005 f_{tar}$.

Figure 5B:
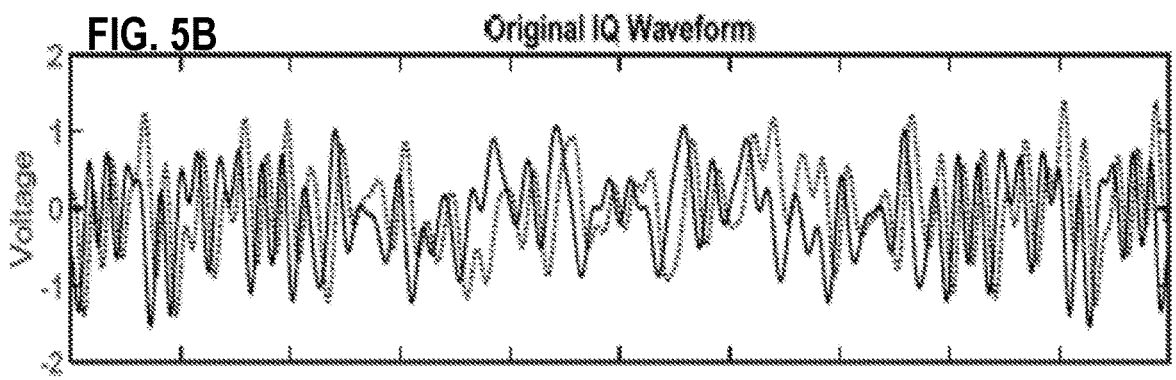
FIG. 5B through FIG. 5D are plots of time series that illustrate example forms of predistortion to produce the target optical waveform of FIG. 5A, according to various embodiments.
Figure 5C:
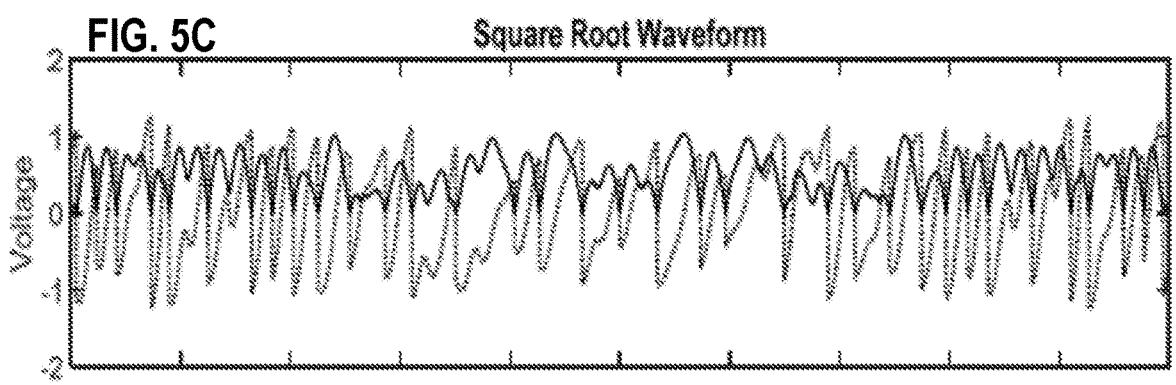
Figure 5D:
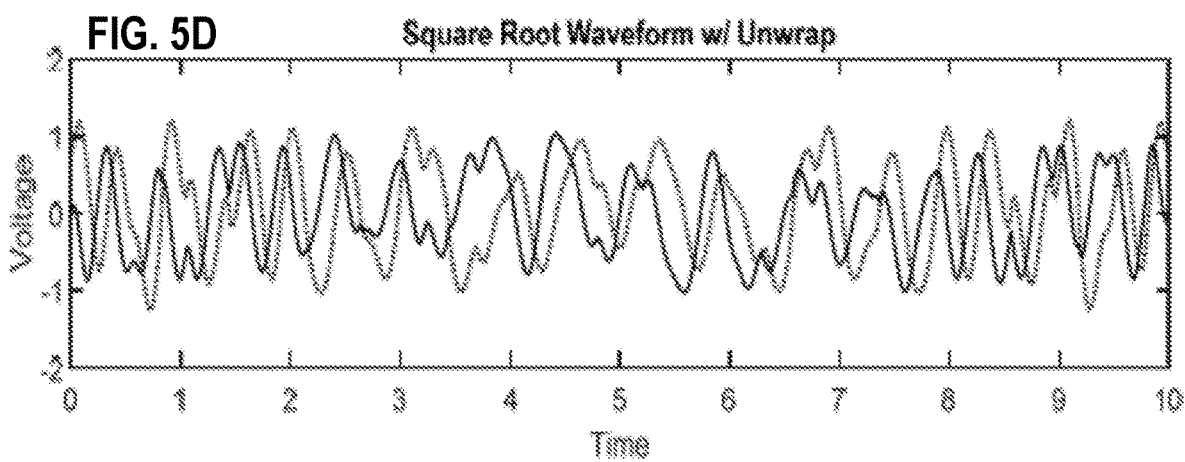

FIG. 5B through FIG. 5D are plots of time series that illustrate example forms of predistortion to produce the target optical waveform of FIG. 5A, according to various embodiments. The horizontal axis in each indicates time in relative units; and, the vertical axis in each indicates voltage in arbitrary units. In each plot the real part, I(t), is shown as a solid trace, and the imaginary part, Q(t), is shown as a dotted trace. FIG. 5B shows the traces of the target waveforms with the spectrum of FIG. 5A at twice the frequency of a modulated laser source. FIG. 5C shows the traces that can be used as inputs to the NLO and that are obtained by taking the square root at each time point of the traces in FIG. 5B. This achieves the goal of producing waveforms with modulations close to the laser frequency $f_0$ that is a subharmonic of $f_{tar}$. However, simply taking the square root of a complex number produces large numbers of cusps and discontinuities as seen in FIG. 5C. Such waveforms are problematic to generate with available modulators.

A smoother trace is easier to produce during modulation. Phase unwrapping is a process that makes phase waveforms more continuous and differentiable. Phase unwrapping is a process that reflects the mathematical identify expressed by Equation 5.

$$\exp\{i\theta\}=\exp\{i(\theta+k2\pi)\} \qquad (5)$$

where k is any integer. In phase unwrapping, an integer (k) multiple of $2\pi$ is added or subtracted to each point to make the difference with the prior point as small as possible. FIG. 5D shows the traces obtained by taking the square root at each time point of the traces in FIG. 5B and applying phase unwrapping to produce an input that can be introduced into the NLO to produce the target waveform of FIG. 5A. The traces of FIG. 5D also achieves the goal of producing waveforms with modulations close to the laser frequency $f_0$ that is a subharmonic of $f_{tar}$; but, without the large number of cusps and discontinuities. The waveforms in both FIG. 5C and FIG. 5D, when squared, numerically produce the target waveform of FIG. 5A and FIG. 5B to near machine precision.

Along with making the I(t) and Q(t) waveforms more continuous and differentiable, the use of the phase unwrapping prior to phase compression results in better bandwidth confinement of the predistorted waveform. This helps mitigate the limits on bandwidth of the optical modulation due to the arbitrary wave generation and RF amplification, or the modulator itself.

Thus, in step 407, the method 400 includes selecting a phase root value from the second set at each time such that a difference between temporally successive values of the selected phase roots is minimized by phase unwrapping.

In step 409, the method 400 includes determining a time varying input amplitude based on one selected amplitude root value from the first set at each time and a time varying input phase based on the phase unwrapped root.

In step 411, an electromagnetic signal from a source is modulated to impose the time varying input amplitude and the time varying input phase to produce a modulated electromagnetic input signal. In step 413, the modulated electromagnetic input signal is introduced into the nonlinear medium to produce a target electromagnetic signal with characteristics very similar to the target electromagnetic waveform. In various embodiments the selection of roots during step 407 and 409 is based at least in part on any errors detected in step 413.

In step 415, the target EM signal is used in an EM system, e.g., is used to probe target 220 in system 200. An example of such a use in an optical system is described in more detail in a later section.

In step 421, it is determined whether another instance of the same target waveform is to be generated. If so, control passes back to step 411 and following. In some of these embodiments, one or more selected roots are adjusted to reduce some measure of error detected in step 413 or step 415. If another instance of the same waveform is not to be generated, control flows to step 423.

In step 423, it is determined whether a different target waveform is to be generated. If so, control passes back to step 401 and following. If not, the process ends.

FIG. 6A through FIG. 6C are spectral plots of the example time series depicted in FIG. 5B through FIG. 5D, respectively, according to various embodiments. These are double sided power spectra for which the horizontal axis indicates frequency in fractional deviations from a reference frequency, which is $f_{tar}$ in FIG. 6A and $f_0$ in FIG. 6B and FIG. 6C. The vertical axis indicates spectral power in relative units on a logarithmic scale. FIG. 6A corresponds to FIG. 5A. As can be seen, the bandwidth using phase unwrapping depicted in FIG. 6C is much more limited than the bandwidth without phase unwrapping depicted in FIG. 6B.

Figure 7A:
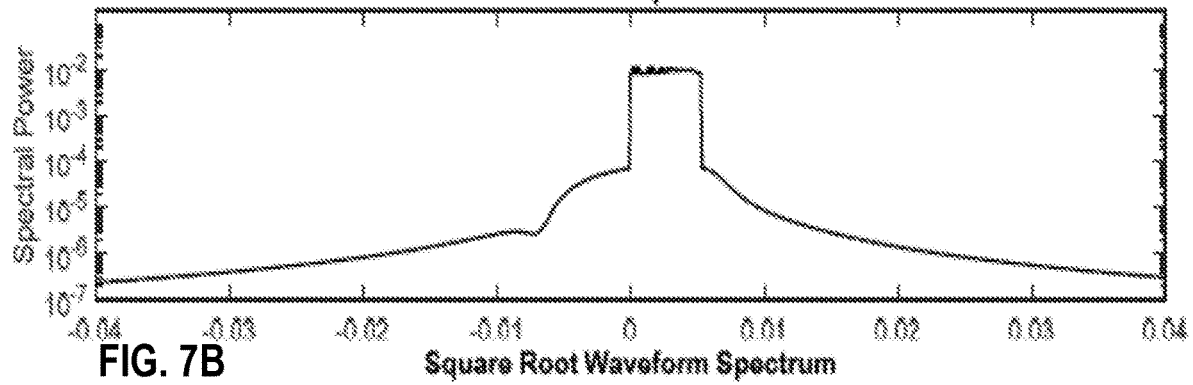
FIG. 7A is a spectral diagram that illustrates an example target waveform, according to an embodiment.

FIG. 7A is a spectral diagram that illustrates an example target waveform, according to another embodiment. The horizontal axis indicates frequency in fractional deviations from a reference frequency, which is $f_{tar}$ in FIG. 7A. The vertical axis indicates spectral power on a logarithmic scale. The trace indicates the spectrum of an original arbitrary waveform filtered with a 6th order Butterworth digital filter at 0.013 of the Nyquist frequency.

Figure 7B:
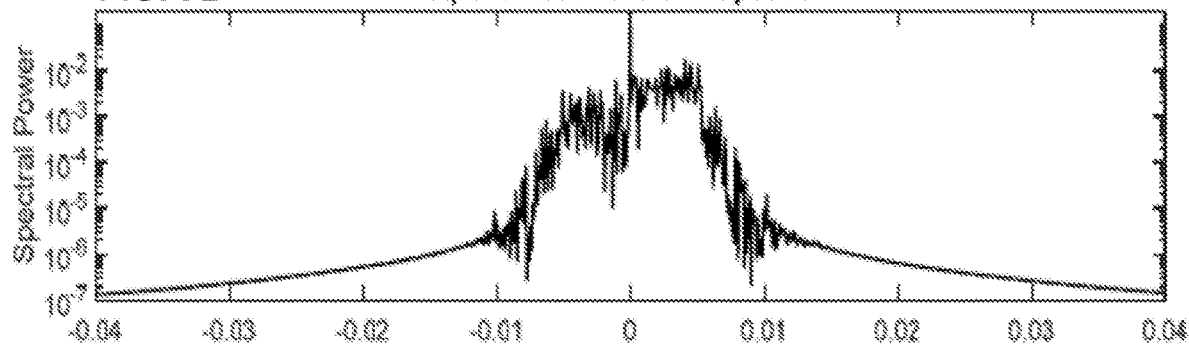
FIG. 7B through FIG. 7C are spectral plots that illustrate example forms of predistortion to produce the example target optical waveform of FIG. 7A, according to various embodiments.
Figure 7C:
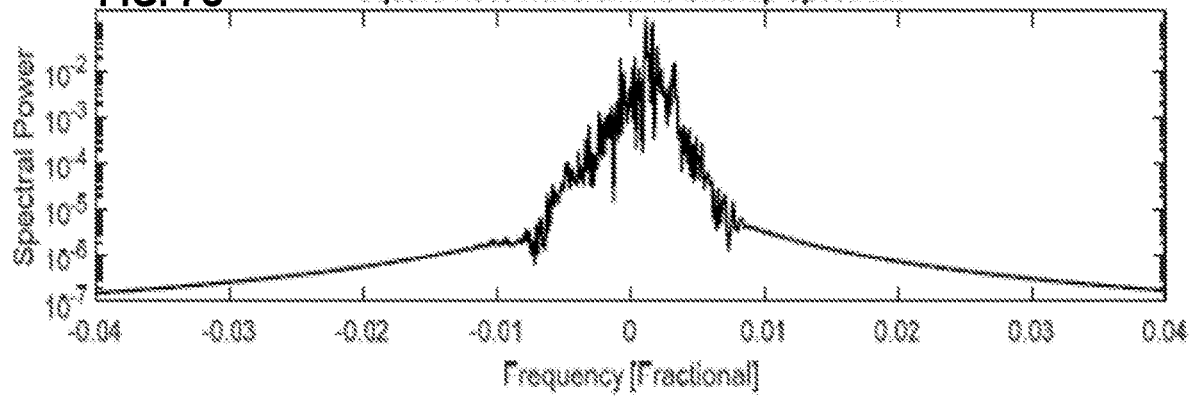

FIG. 7B through FIG. 7C are spectral plots that illustrate example forms of predistortion to produce the example target optical waveform of FIG. 7A, according to various embodiments. In each plot, the horizontal axis indicates frequency in fractional deviations from a reference frequency, which is $f_0$; and, the vertical axis indicates spectral power on a logarithmic scale. Each trace is the spectral waveform filtered with a 6th order Butterworth digital filter at 0.013 of the Nyquist frequency. FIG. 7B depicts a trace based on taking the complex square root waveform without phase unwrapping. FIG. 7C depicts a trace based on taking the complex square root waveform with phase unwrapping. In FIG. 6C the bandwidth required of a modulator is much less.

FIG. 8A is a time series that illustrates an example target waveform, according to another embodiment. The horizontal axis indicates time in arbitrary units; and, the vertical axis indicates voltage in relative units. The solid trace indicates I(t) and the dashed trace indicates Q(t), both filtered as described above for the traces of FIG. 7A. These waveforms produce the arbitrary waveform of FIG. 7A.

FIG. 8B through FIG. 8C are time series that illustrate example errors in the time series produced by various forms of predistortion compared to the target optical waveform of FIG. 8A, according to various embodiments. For both, the horizontal axis indicates time in arbitrary units; and, the vertical axis indicates voltage in relative units. For both the solid trace indicates the error in the in phase component; and the dashed trace indicates the error in the quadrature component. FIG. 8B shows the deviations from the traces of FIG. 8A for the square root without phase unwrap. FIG. 8C shows the deviations for the traces of FIG. 8A for the square root with phase unwrap. It can be seen that using the phase unwrap makes the final 2nd harmonic signal produced have less error sensitivity to bandwidth.

2. Example Embodiments

Experimental embodiments were developed in the context of generating phase and amplitude modulated chirped waveforms for Spatial-Spectral Holographic (SSH) signal processing applications, as described by Babbitt et al, 2014, listed in the references in a later section. An example SSH material is an inhomogeneously broadened transition (IBT) material with a limited number of absorbers in a broad absorption band, which can record the spatial and spectral properties of light that has passed through it, and can influence the spatial and spectral interactions with light subsequently passing through it. Such material is described, for example, in U.S. Pat. No. 7,265,712 issued Sep. 4, 2007, the entire contents of which are hereby incorporated by reference as if fully set for the herein.

For this application two optical chirps (waveforms having a frequency that varies with time) on separate optical path angles are overlapped in a cryogenic, Rare-Earth doped crystal which stores an SSH grating which implements a cross-correlation operation on analog signal or digital data modulated onto a third optical path angle overlapped in the same crystal volume. The response of the crystal is to generate an echo containing the coherent cross-correlation of the signal programmed by the two optical chirps, and the optical signal in the third path. The operating wavelength in such materials is about 794 nm, which in the system is attained by $\chi^{(2)}$ NLO processes in single-pass periodically poled NLO waveguides beginning with laser frequency $f_0$ corresponding to wavelengths at about 1588 nm. Such lasers are commercially available because they are designed for the fiber telecommunications L-band (wavelengths from about 1570 nm to about 1610 nm). The choice of laser plus NLO is governed by the ready availability of frequency stable and narrow linewidth fiber laser sources, high power optical modulators, and other fiber components such as fiber Bragg-grating filters at the longer wavelengths.

Figure 9:
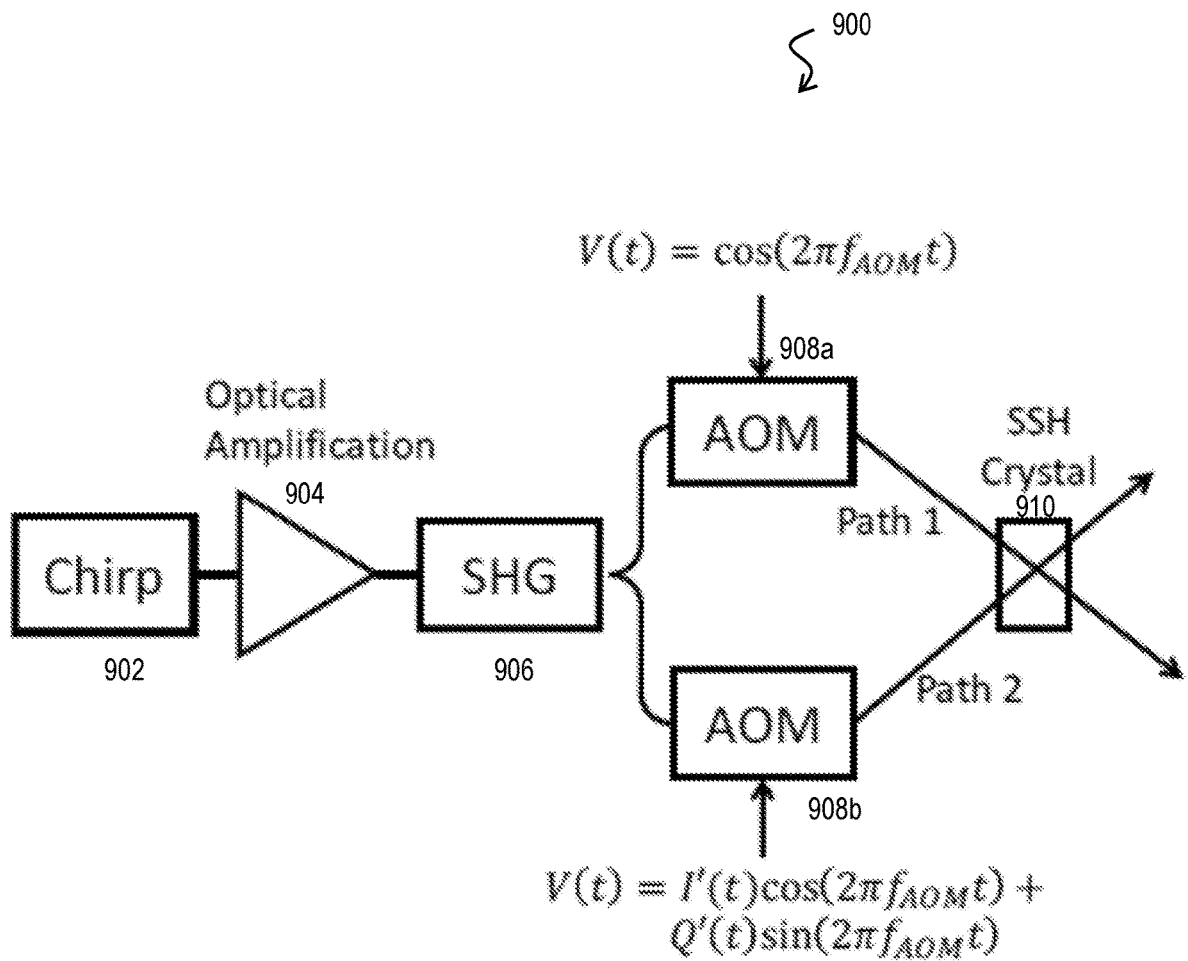
FIG. 9 is a block diagram that illustrates an optical apparatus utilizing nonlinear optics to probe a Spatial Spectral Holographic (SSH) material for a correlative filter without predistortion.

FIG. 9 is a block diagram that illustrates an optical apparatus utilizing nonlinear optics to probe a Spatial Spectral Holographic (SSH) material for a correlative filter without predistortion. An optical chirp is produced in component 902 in a frequency band near the laser frequency, and amplified in optical amplifier 904, and then introduced to a second-harmonic generation (SHG) NLO material 906 to output an optical chirp with a frequency in a vicinity of a target frequency. The output waveform is then split into two paths, each modulated using an acousto-optic modulator 908a or 908b, respectively. The modulated high frequency output on each path is then directed to SSH crystal 910.

The optical chirp from component 902 is up to 16 Gigahertz (GHz, 1 GHz=$10^9$ hertz, Hz) in bandwidth centered at a frequency $f_0$ of about 189 Terahertz (THz, 1 THz=$10^{12}$ Hz) corresponding to a wavelength of 1588 nm, and the waveform describe by Equation 6a.

$$E_{f_0}(t)=E_0 \exp[i(2\pi f_0 t+\pi\kappa t^2)]\times\{H(t+t_{start})H(t_{stop}-t)\} \quad (6a)$$

where κ is the chirp rate (in Hz per second) and H(t) is the Heaviside function. Prior to various techniques described above, this chirp was then frequency doubled to about 377.5 THz (a wavelength of about 794 nm) using a periodically-poled NLO waveguide as SHG NLO medium 906; thus, generating a chirp of twice the bandwidth (up to 32 GHz in bandwidth) by distributing the square inside the exponential function as a product, as expressed in Equation 6b.

$$E_{2f_0}(t)=E_{f_0}(t)^2 \propto E_0^2 \exp[i(2\pi 2f_0 t+\pi 2\kappa t^2)]\times\{H(t-t_{start})H(t_{stop}-t)\} \quad (6b)$$

This doubled chirp at 794 nm is then split into two paths, which are then amplitude and phase modulated (e.g., IQ processed) with Acousto-Optic Modulators (AOMs) 908a and 908b before being overlapped in the crystal 910. Various fiber coupled and free-space AOMs had been utilized but in all cases, the AOM bandwidth limited the modulation bandwidth onto the chirped waveforms which limits time-bandwidth product of the correlation filter programmed into the SSH material. Electro-optic modulation, which can have significantly higher bandwidth, at the 794 nm wavelength is limited by the power handling capability of LiNbO3 waveguide modulators at 794 nm.

In an alternative attempt, a sum frequency generation (SFG) method similar to that described in FIG. 3B was developed and implemented. However, this approach also suffered some disadvantages. Significant RF and optical resources were required to generate the widely separated pump and chirped laser sources to cleanly generate the two modulated chirps for programming.

In yet another approach, broadband IQ modulation of the optical chirp at 1588 nm is followed by simple second-harmonic generation (SHG). However, this caused the issue that the I(t) and Q(t) modulation is also squared in the SHG process, as explained above.

Figure 10:
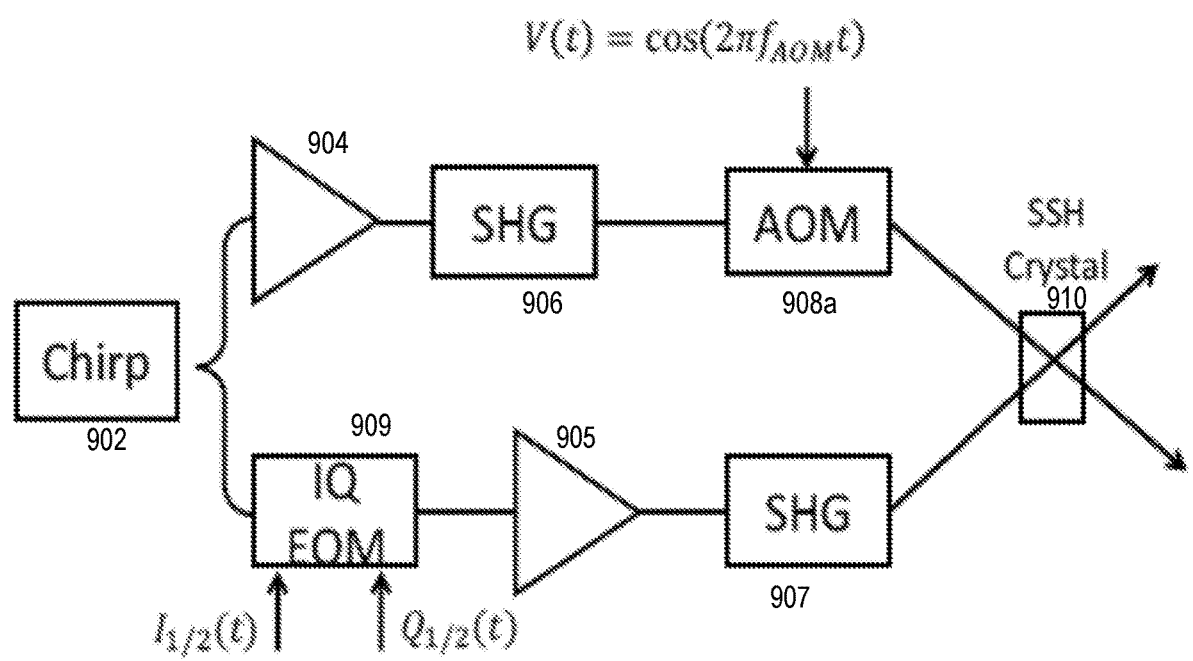
FIG. 10 is a block diagram that illustrates an optical apparatus utilizing nonlinear optics to probe a Spatial Spectral Holographic (SSH) material for a correlative filter with predistortion, according to an embodiment.

In an example embodiment, the predistortion method 400 of FIG. 4 is used. FIG. 10 is a block diagram that illustrates an optical apparatus utilizing nonlinear optics to probe a Spatial Spectral Holographic (SSH) material for a correlative filter with predistortion, according to an embodiment. An optical chirp is produced in component 902 in a frequency band near the laser frequency, and split, with a first path amplified in optical amplifier 904, and then introduced to a second-harmonic generation (SHG) NLO material 906 to output an optical chirp with a frequency in a vicinity of a target frequency. The output waveform is then modulated using an acousto-optic modulator 908a and directed to crystal 910. The second path of the split chirp is subjected to IQ predistortion modulation in electro-optic modulator (EOM) 909, amplified in optical amplifier 905 and introduced to a separate SHG NLO medium 907 before being directed along a separate path into SSH crystal 910.

In this example, the optical circuit begins with a common single-sideband optical chirp at 1588 nm for paths 1 & 2. Path 1 is amplified by an Erbium Doped Fiber Amplifier (EDFA) 904 and sent through an SHG device 906 to frequency double (while simultaneously doubling the bandwidth) the waveform from the laser to a wavelength of 794 nm. Path 2 is sent through a double-nested Mach-Zehnder modulator 909 configured for Single Side Band Suppressed Carrier (SSB-SC) modulation. Modulator 909 is driven by the predistorted $I_{1/2}(t)$ and $Q_{1/2}(t)$ waveforms constructed as described above where the ½ in the subscript indicates that the waveforms are related to a square root, but are constructed using the process described herein to generate the desired modulation after optical frequency doubling. Similarly, higher order roots generated by the described process would be indicated by a $1/n$ subscript. The output of the IQ modulator is amplified by an EDFA 905 and sent through a SHG device 907 which frequency doubles to 794 nm. An AOM 908a at 794 nm on path 1 provides a single frequency shift of 125 MHz to compensate for the single-sided waveform input the IQ EOM 909. Paths 1 & 2 are then overlapped in the SSH crystal 910 to form the correlative SSH grating.

An advantage of this embodiment, is that one can utilize an electro-optic based IQ modulator 909 at 1586 nm as shown in FIG. 10, which provides as much as a factor of 100 greater bandwidth than AOM 908b in FIG. 9. This greater bandwidth allows larger time-bandwidth product correlative filters to be programmed into the SSH crystal 910. Other advantages with this technique include: allowing the use of fiber amplifiers to compensate for optical loss in the IQ EOM; and, increased peak-to-rms dynamic range of the final modulated optical waveform due to the nonlinearity of the SHG process.

Figure 11:
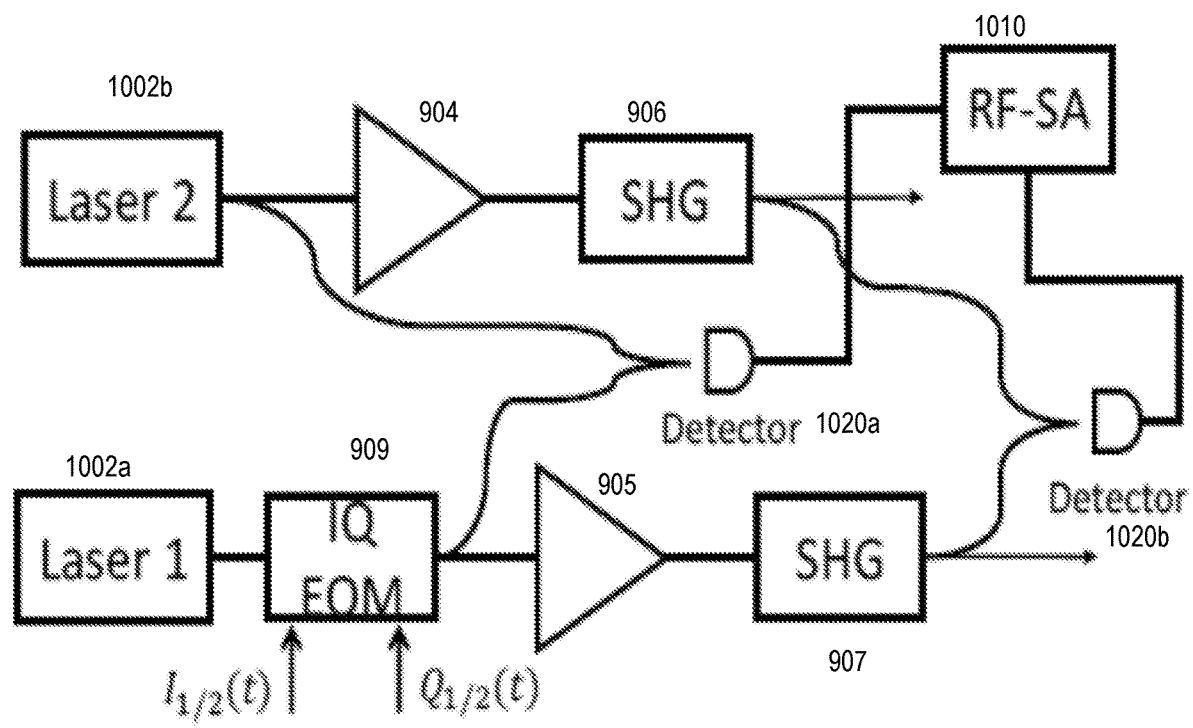
FIG. 11 is a block diagram that illustrates an experimental optical apparatus for measuring predistorted waveforms before and after impinging on nonlinear optics material, according to an embodiment.

The effectiveness of the predistortion waveforms was tested experimentally using the setup in FIG. 11. FIG. 11 is a block diagram that illustrates an experimental optical apparatus for measuring predistorted waveforms before and after impinging on nonlinear optics material, according to an embodiment. This setup uses two lasers 1002a and 1002b. The first laser 1002a feeds IQ EOM 909 and the predistorted waveform is heterodyne detected at detector 1020a by mixing with the single tone optical waveform from laser 1002b. The output waveform is produced by amplifying the predistorted waveform in amplifier 905, introducing the amplified optical waveform to SHG NLO device 907, and performing heterodyne detection at a second detector 1020b by mixing with the single tone optical waveform from laser 1002b after amplification in amplifier 904 and frequency doubling in SHG NLO device 906. The heterodyne detection puts the oscillations at RF bands that are processed in RF spectrum analyzer 1010.

Thus, two single-frequency lasers 1002a, 1002b are used to provide a heterodyne measurement setup for both before and after the SHG process. The IQ waveform is modulated onto laser 1002a and a fiber pick-off before amplifier 905 and after the SHG device 907 is inserted to send to the heterodyne measurement, which consists of a 1×2 fiber combiner and a fast photodetector 1020a. Laser 1002b serves as a local oscillator for the heterodyne measurement and is about 2 GHz shifted from Laser 1002a. It also has a pick-off before amplifier 904 and after the SHG device 906 that are sent to the 1588 nm and the 794 nm heterodyne measurement systems at detectors 1020a and 1020b, respectively. The output heterodyne signal is sent to a radio frequency spectrum analyzer (RF-SA) 1010 for analysis.

Figure 12A:
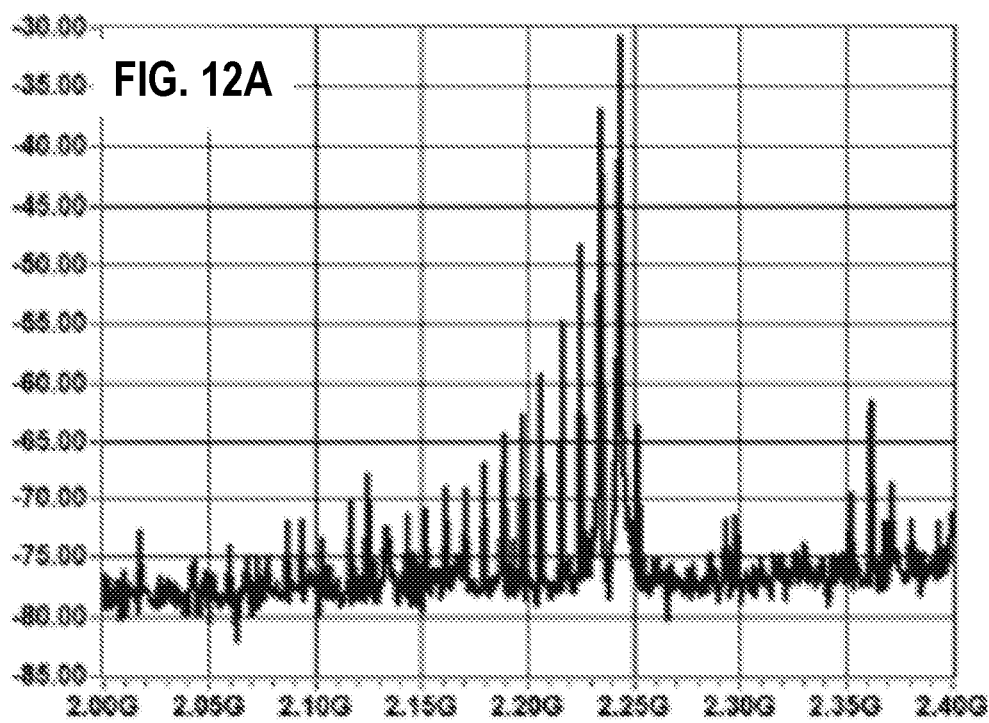
FIG. 12A and FIG. 12B are spectral plots of measured predistorted input and measured target output, respectively, according to an embodiment.
Figure 12B:
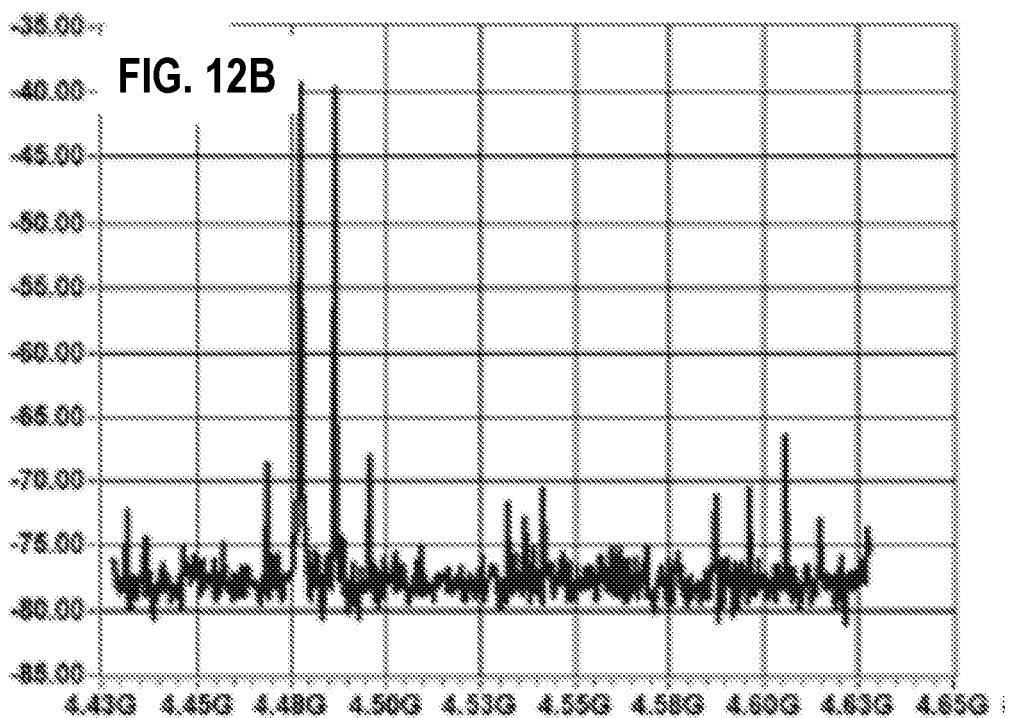

FIG. 12A through FIG. 12D show two examples of the spectra of the predistorted and post SHG signals. FIG. 12A and FIG. 12B are spectral plots of measured predistorted input and measured target output, respectively, according to an embodiment. In each, the horizontal axis indicated frequency in GHz and the vertical axis indicates relative power in deciBels (dB, 10 dB indicates one power of ten in intensity). Note that the frequency range in FIG. 12B is higher than in FIG. 12A. In this first example, that the target waveform is two continuous wave (CW) tones separated by 10 megahertz (MHz, 1 MHz=$10^6$ hertz). As can be seen, the predistorted waveform in FIG. 12A is a comb of CW tones separated by 10 MHz but tailing off fairly rapidly further from the center frequency. After the SHG frequency conversion the signal spectrum consists mostly of two tones with the harmonic spurs more than 29 dB down from the desired frequencies.

Figure 12C:
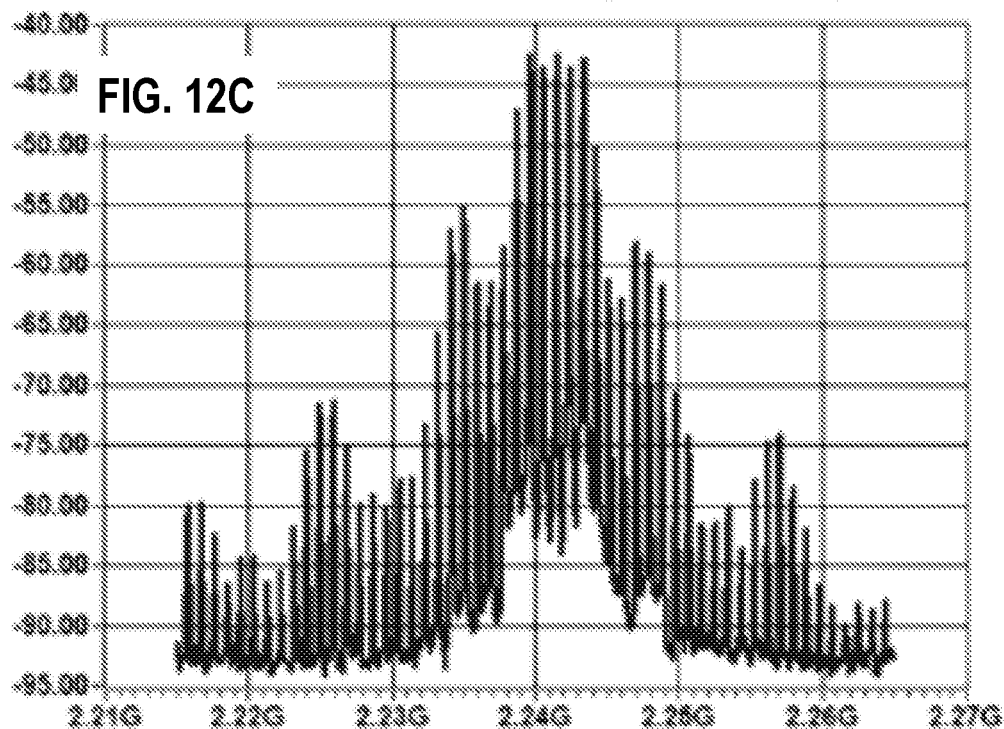
FIG. 12C and FIG. 12D are spectral plots of measured predistorted input and measured target output, respectively, according to another embodiment.
Figure 12D:
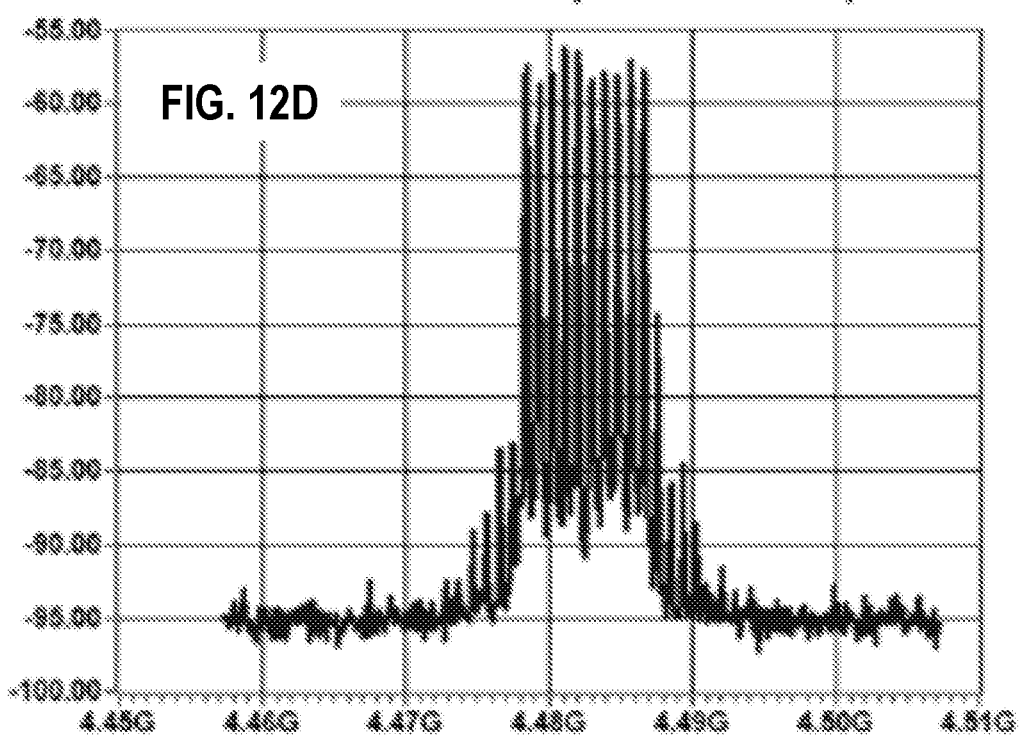

FIG. 12C and FIG. 12D are spectral plots of measured predistorted input and measured target output, respectively, according to another embodiment. In each, the horizontal axis indicated frequency in GHz and the vertical axis indicates relative power in dB. Note that the frequency range in FIG. 12D is higher than in FIG. 12C. In this second example, the target waveform was 10 tones separated by 1 MHz with random binary 0, π phases on each tone. The predistorted waveform in FIG. 12C is highly structured. Again, the waveform after SHG in FIG. 12D has high fidelity with spurs down by more than 28 dB.

In addition to these heterodyne tests, other embodiments of this new predistorted IQ modulation system were utilized for the SSH experiments—enabling cross-correlation of BPSK patterns greater than 32,768 bits long using more than 300 MHz of bandwidth. This represents an enhancement of more than a factor of 4 over the prior approach using AOMs. With such embodiments of IQ EOM modulation with predistortion, the time-bandwidth product of the SSH correlative system is now only limited by material coherence effects, rather than the supporting photonic components.

3. Computational Hardware Overview

Figure 13:
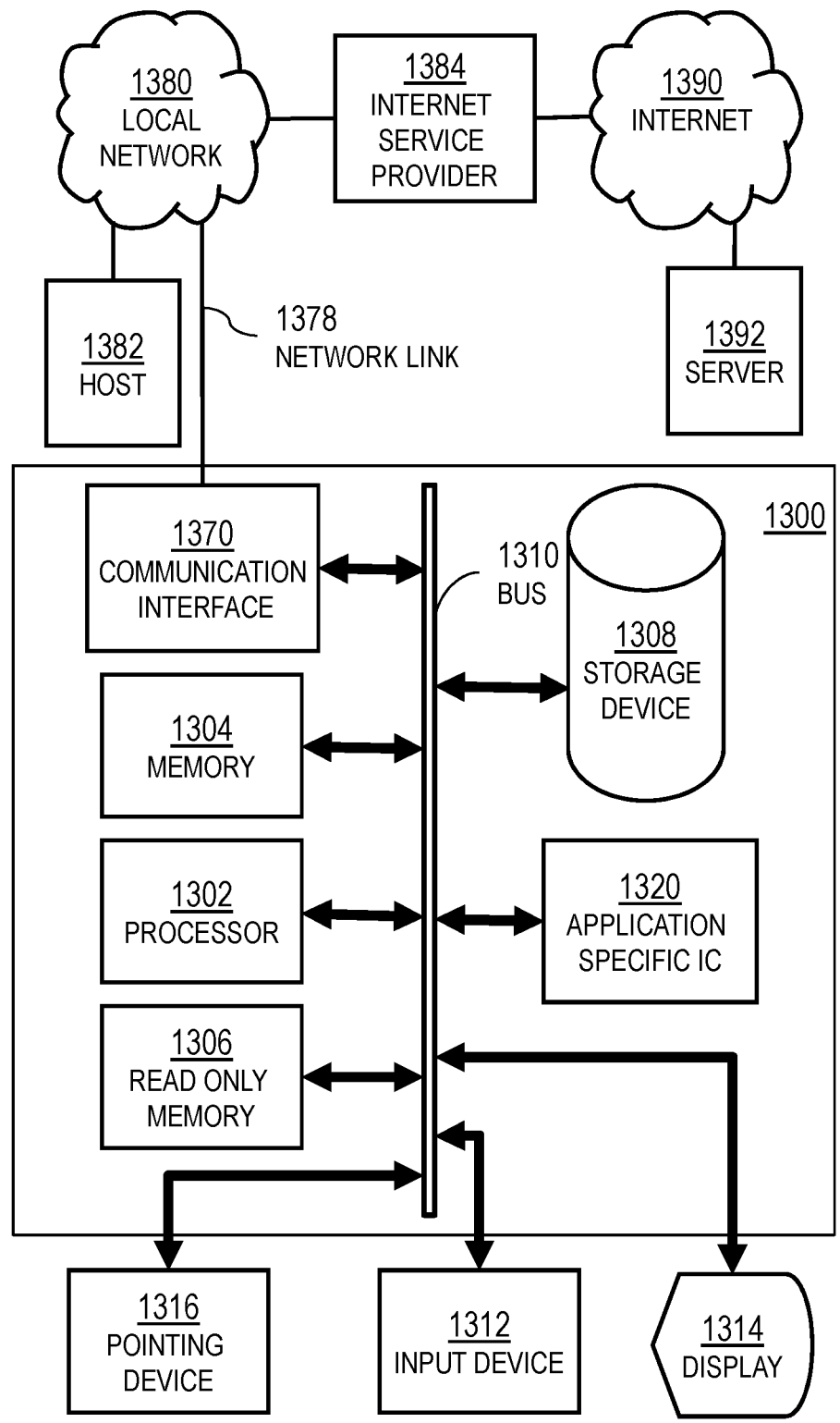
FIG. 13 is a block diagram that illustrates a computer system 1300 upon which an embodiment of the invention may be implemented.

FIG. 13 is a block diagram that illustrates a computer system 1300 upon which an embodiment of the invention may be implemented. Computer system 1300 includes a communication mechanism such as a bus 1310 for passing information between other internal and external components of the computer system 1300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of one or more methods described herein.

A sequence of binary digits constitutes digital data that is used to represent a number or code for a character. A bus 1310 includes many parallel conductors of information so that information is transferred quickly among devices coupled to the bus 1310. One or more processors 1302 for processing information are coupled with the bus 1310. A processor 1302 performs a set of operations on information. The set of operations include bringing information in from the bus 1310 and placing information on the bus 1310. The set of operations also typically include comparing two or more units of information, shifting positions of units of information, and combining two or more units of information, such as by addition or multiplication. A sequence of operations to be executed by the processor 1302 constitutes computer instructions.

Computer system 1300 also includes a memory 1304 coupled to bus 1310. The memory 1304, such as a random access memory (RAM) or other dynamic storage device, stores information including computer instructions. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of computer instructions. The computer system 1300 also includes a read only memory (ROM) 1306 or other static storage device coupled to the bus 1310 for storing static information, including instructions, that is not changed by the computer system 1300. Also coupled to bus 1310 is a non-volatile (persistent) storage device 1308, such as a magnetic disk or optical disk or solid state storage, for storing information, including instructions, that persists even when the computer system 1300 is turned off or otherwise loses power.

Information, including instructions, is provided to the bus 1310 for use by the processor from an external input device 1312, such as a keyboard containing alphanumeric keys operated by a human user, or a sensor. A sensor detects conditions in its vicinity and transforms those detections into signals compatible with the signals used to represent information in computer system 1300. Other external devices coupled to bus 1310, used primarily for interacting with humans, include a display device 1314, such as a cathode ray tube (CRT) or a liquid crystal display (LCD), for presenting images, and a pointing device 1316, such as a mouse or a trackball or cursor direction keys, for controlling a position of a small cursor image presented on the display 1314 and issuing commands associated with graphical elements presented on the display 1314.

In the illustrated embodiment, special purpose hardware, such as an application specific integrated circuit (IC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1370 sends and receives electrical, acoustic or electromagnetic signals, including infrared and optical signals, that carry information streams, such as digital data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, or solid-state storage such as storage device 1308. Volatile media include, for example, dynamic memory 1304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1302, except for carrier waves and other signals.

Logic encoded in one or more tangible media includes one or both of processor instructions on a computer-readable storage media and special purpose hardware, such as ASIC 1320.

Network link 1378 typically provides information communication through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390. A computer called a server 1392 connected to the Internet provides a service in response to information received over the Internet. For example, server 1392 provides information representing video data for presentation at display 1314.

The invention is related to the use of computer system 1300 for implementing the techniques described herein. According to one embodiment of the invention, those techniques are performed by computer system 1300 in response to processor 1302 executing one or more sequences of one or more instructions contained in memory 1304. Such instructions, also called software and program code, may be read into memory 1304 from another computer-readable medium such as storage device 1308. Execution of the sequences of instructions contained in memory 1304 causes processor 1302 to perform the method steps described herein. In alternative embodiments, hardware, such as application specific integrated circuit 1320, may be used in place of or in combination with software to implement the invention. Thus, embodiments of the invention are not limited to any specific combination of hardware and software.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server 1392 transmits program code for a particular application, requested by a message sent from computer 1300, through Internet 1390, ISP equipment 1384, local network 1380 and communications interface 1370. The received code may be executed by processor 1302 as it is received, or may be stored in storage device 1308 or other non-volatile storage for later execution, or both. In this manner, computer system 1300 may obtain application program code in the form of a signal on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red a carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

Figure 14:
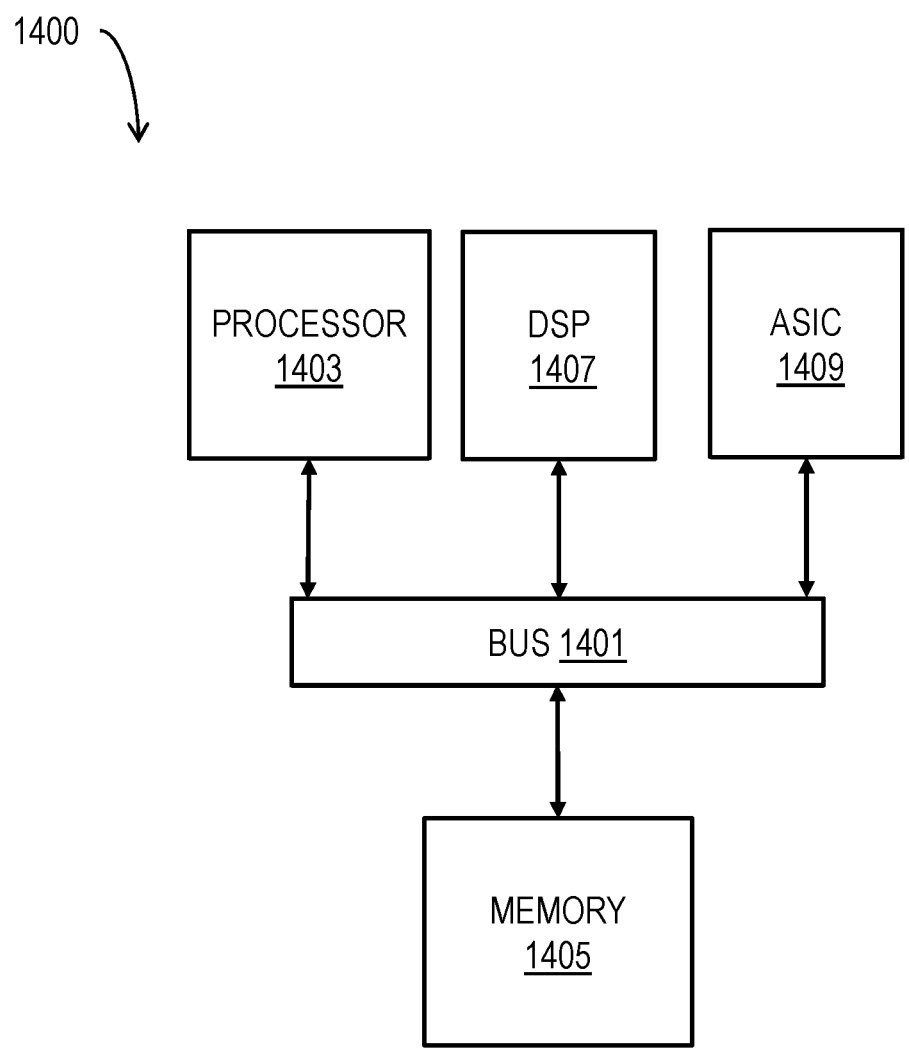
FIG. 14 illustrates a chip set upon which an embodiment of the invention may be implemented.

FIG. 14 illustrates a chip set 1400 upon which an embodiment of the invention may be implemented. Chip set 1400 is programmed to perform one or more steps of a method described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1400, or a portion thereof, constitutes a means for performing one or more steps of a method described herein.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1405 also stores the data associated with or generated by the execution of one or more steps of the methods described herein.

4. Alternatives, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

z. REFERENCES

The following references are hereby incorporated by reference as if fully set forth herein, except for notation that is inconsistent with that used herein.
1. Laurell, F. "Periodically Poled Materials for Miniature Light Sources" Optical Materials 11, no. 2-3 (1999): 235-244.
2. Roberts, A. D. and Battle, P. R. "U.S. Pat. No. 7,145,714—Segmented Electrodes for Poling of Ferroelectric Crystal Materials" (2006)
3. Rusu, M., Rafailov, E. U., Herda, R., Okhotnikov, O. G., Saltiel, S. M., Battle, P., McNeil, S., Grudinin, A. B., and Sibbett, W. "Efficient Generation of Green and UV Light in a Single PP-KTP Waveguide Pumped by a Compact All-Fiber System" Applied Physics Letters 88, no. 12 (2006): 121105.
4. Laurell, F., Brown, J. B., and Bierlein, J. D. "Sum-frequency Generation in Segmented KTP Waveguides" Applied Physics Letters 60, no. 9 (1992): 1064-1066.
5. Barbour, R. J., Brewer, T., and Barber, Z. W. "High Power and High SFDR Frequency Conversion Using Sum Frequency Generation in KTP Waveguides" Optics Letters 41, no. 15 (2016): 3639.
6. Carraz, O., Lienhart, F., Charrière, R., Cadoret, M., Zahzam, N., Bidel, Y., and Bresson, A. "Compact and Robust Laser System for Onboard Atom Interferometry" Applied Physics B 97, no. 2 (2009): 405.
7. Babbitt, W. R., Barber, Z. W., Bekker, S. H., Chase, M. D., Harrington, C., Merkel, K. D., Mohan, R. K., Sharpe, T., Stiffler, C. R., Traxinger, A. S., and Woidtke, A. J. "From Spectral Holeburning Memory to Spatial-Spectral Microwave Signal Processing" Laser Physics 24, no. 9 (2014): 094002.
8. Barber, Z. W., Harrington, C., Rupavatharam, K., Jackson, T., Stiffler, C., Sellin, P. B., and Merkel, K. D. "Spatial-Spectral Holographic Real-Time Correlative Optical Processor with >100 Gb/s Throughput" Applied Optics Accepted, unpublished.
9. Roberts, B. F., U.S. Pat. No. 9,829,910; "Harmonic Arbitrary Waveform Generator" (2017)
10. Nation, M., United States Patent Publication No. 20020181605A1, "Combining Frequency Multiplication and Modulation" (2002)
11. Davies, R. J., U.S. Pat. No. 6,587,257, "Non-Linear Subcarrier Predistortion and Upconversion System" (2003)
12. Kintis, M., United States Patent Publication No. 20030043933, "Phase Modulation Power Spreading Used to Reduce RF or Microwave Transmitter Output Power Spur Levels" (2003)
13. Armstrong, J., PCT Publication No. 2008092193, "Methods and Apparatus for Generation and Transmission of Optical Signals" (2008)
14. Atlas, D. A., Jr, R. E. P., and Little, F. R., U.S. Pat. No. 5,963,352, "Linearization Enhanced Operation of Single-Stage and Dual-Stage Electro-Optic Modulators" (1999)
15. Templ, W. and Wiegner, D., EP Publication No. EP2234454A1, "A Method for Data Transmission Using an Envelope Elimination and Restoration Amplifier, an Envelope Elimination and Restoration Amplifier, a Transmitting Device, a Receiving Device and a Communication Network Therefor" (2010)
16. Vieira, A. and Ramachandran, M., United States Patent Publication No. 20070147848, "Method and Apparatus for Reducing Clipping in an Optical Transmitter by Phase Decorrelation" (2007)
17. Zelm, J. P. van and Davies, R. J. "Pure Harmonic Upconversion in Radio-on-Fiber Systems" Optical Transmission Systems and Equipment for Wdm Networking Ii 5247, (2003): 382-392.
18. Babbitt, W. R., Barber, Z. W., Bekker, S. H., Chase, M. D., Harrington, C., Merkel, K. D., Mohan, R. K., Sharpe, T., Stiffler, C. R., Traxinger, A. S., and Woidtke, A. J. "From Spectral Holeburning Memory to Spatial-Spectral Microwave Signal Processing" Laser Physics 24, no. 9 (2014): 094002.
19. Stiffler, C. R., Bekker, S. H., Merkel, K. D., Reibel, R. R., Babbitt, W. R., and Rupavatharam, K. M. "U.S. Pat. No. 9,020,360—Techniques for Single Sideband Suppressed Carrier (SSBSC) Optical Signals That Scale to Bandwidths over 20 Gigahertz" (2015)

What is claimed is:
1. A method for generating an arbitrary target electromagnetic signal with a nonlinear material, the method comprising:
determining a target electromagnetic waveform having a time varying target amplitude and a time varying target phase;
determining an integer order n of a nonlinear material to use in generation of the target electromagnetic waveform;
determining, for each time, a first set of nth roots of the target amplitude and a second set of nth roots of the target phase;
determining a time varying input amplitude based on one selected amplitude root value from the first set at each time and a time varying input phase based on one selected phase root value from the second set at each time, wherein a difference between temporally successive values of the selected phase roots is minimized by phase unwrapping;
modulating an electromagnetic signal from a source to impose the time varying input amplitude and the time varying input phase to produce a modulated electromagnetic input signal; and introducing the modulated electromagnetic input signal into the nonlinear material to produce a target electromagnetic signal.

2. The method as recited in claim 1, wherein the target electromagnetic waveform is complex.

3. The method as recited in claim 2, wherein the modulated electromagnetic input signal is complex.

4. The method as recited in claim 1, wherein said modulating the electromagnetic signal from the source is performed with a computer-controlled radio frequency modulator.

5. The method as recited in claim 1, wherein the one selected amplitude root value from the first set at each time is a positive definite value.

6. The method as recited in claim 1, wherein the nonlinear material produces harmonic waveform generation.

7. The method as recited in claim 1, wherein the source is a laser, the electromagnetic signal is an optical signal, the modulated electromagnetic input signal is a modulated optical signal, the nonlinear material is a non-linear optical material, and the target electromagnetic signal is a target optical signal.

8. A non-transitory computer-readable medium carrying one or more sequences of instructions, wherein execution of the one or more sequences of instructions by one or more processors causes the one or more processors to perform the steps of:
  determining a target electromagnetic waveform having a time varying target amplitude and a time varying target phase;
  determining an integer order n of a nonlinear material to use in generation of the target electromagnetic waveform;
  determining, for each time, a first set of nth roots of the target amplitude and a second set of nth roots of the target phase;
  determining a time varying input amplitude based on one selected amplitude root value from the first set at each time and a time varying input phase based on one selected phase root value from the second set at each time, wherein a difference between temporally successive values of the selected phase roots is minimized by phase unwrapping; and
  modulating an electromagnetic signal from a source to impose the time varying input amplitude and the time varying input phase to produce a modulated electromagnetic input signal, wherein the modulated electromagnetic input signal is introduced into the nonlinear material to produce a target electromagnetic signal.

9. The non-transitory computer-readable medium as recited in claim 8, wherein the target electromagnetic waveform is complex.

10. The non-transitory computer-readable medium as recited in claim 9, wherein the modulated electromagnetic input signal is complex.

11. The non-transitory computer-readable medium as recited in claim 8, wherein said modulating the electromagnetic signal from the source is performed with a computer-controlled radio frequency modulator.

12. The non-transitory computer-readable medium as recited in claim 8, wherein the one selected amplitude root value from the first set at each time is a positive definite value.

13. The non-transitory computer-readable medium as recited in claim 8, wherein the nonlinear material produces harmonic waveform generation.

14. The non-transitory computer-readable medium as recited in claim 8, wherein the source is a laser, the electromagnetic signal is an optical signal, the modulated electromagnetic input signal is a modulated optical signal, the nonlinear material is a non-linear optical material, and the target electromagnetic signal is a target optical signal.

15. An apparatus comprising:
  at least one processor; and
  at least one memory including one or more sequences of instructions,
  the at least one memory and the one or more sequences of instructions configured to, with the at least one processor, cause the apparatus to perform at least the following,
  determining a target electromagnetic waveform having a time varying target amplitude and a time varying target phase;
  determining an integer order n of a nonlinear material to use in generation of the target electromagnetic waveform;
  determining, for each time, a first set of nth roots of the target amplitude and a second set of nth roots of the target phase;
  determining a time varying input amplitude based on one selected amplitude root value from the first set at each time and a time varying input phase based on one selected phase root value from the second set at each time, wherein a difference between temporally successive values of the selected phase roots is minimized by phase unwrapping; and
  modulating an electromagnetic signal from a source to impose the time varying input amplitude and the time varying input phase to produce a modulated electromagnetic input signal, wherein the modulated electromagnetic input signal is introduced into the nonlinear material to produce a target electromagnetic signal.

16. The apparatus as recited in claim 15, wherein the target electromagnetic waveform is complex.

17. The apparatus as recited in claim 16, wherein the modulated electromagnetic input signal is complex.

18. The apparatus as recited in claim 15, wherein said modulating the electromagnetic signal from the source is performed with a computer-controlled radio frequency modulator.

19. The apparatus as recited in claim 15, wherein the one selected amplitude root value from the first set at each time is a positive definite value.

20. The apparatus as recited in claim 15, wherein the nonlinear material produces harmonic waveform generation.

21. The apparatus as recited in claim 15, wherein the source is a laser, the electromagnetic signal is an optical signal, the modulated electromagnetic input signal is a modulated optical signal, the nonlinear material is a non-linear optical material, and the target electromagnetic signal is a target optical signal.

22. A system comprising:
  a source for an electromagnetic signal;
  a processor-controlled electromagnetic modulator;
  a nonlinear material, wherein the system is configured to introduce the electromagnetic signal into the modulator and to introduce a modulated electromagnetic input signal from the modulator into the nonlinear material to produce a target electromagnetic signal;
  at least one processor; and
  at least one memory including one or more sequences of instructions, the at least one memory and the one or more sequences of instructions configured to, with the at least one processor, cause the processor to perform at least the following, determining a target electromagnetic waveform having a time varying target amplitude and a time varying target phase;

determining an integer order n of a nonlinear material to use in generation of the target electromagnetic waveform;

determining, for each time, a first set of nth roots of the target amplitude and a second set of nth roots of the target phase;

determining a time varying input amplitude based on one selected amplitude root value from the first set at each time and a time varying input phase based on one selected phase root value from the second set at each time, wherein a difference between temporally successive values of the selected phase roots is minimized by phase unwrapping; and modulating the electromagnetic signal from the source to impose the time varying input amplitude and the time varying input phase to produce the modulated electromagnetic input signal.

23. The system as recited in claim 22, wherein the target electromagnetic waveform is complex.

24. The system as recited in claim 23, wherein the modulated electromagnetic input signal is complex.

25. The system as recited in claim 22, wherein said modulating the electromagnetic signal from the source is performed with a computer-controlled radio frequency modulator.

26. The system as recited in claim 22, wherein the one selected amplitude root value from the first set at each time is a positive definite value.

27. The system as recited in claim 22, wherein the nonlinear material produces harmonic waveform generation.

28. The system as recited in claim 22, wherein the source is a laser, the electromagnetic signal is an optical signal, the modulated electromagnetic input signal is a modulated optical signal, the nonlinear material is a non-linear optical material, and the target electromagnetic signal is a target optical signal.

* * * * *